US012578882B2

(12) United States Patent
Arai et al.

(10) Patent No.: US 12,578,882 B2
(45) Date of Patent: Mar. 17, 2026

(54) SYSTEM, METHOD, AND PROGRAM FOR DATA TRANSFER PROCESS

(71) Applicant: Hitachi, Ltd., Tokyo (JP)

(72) Inventors: Masahiro Arai, Tokyo (JP); Akira Deguchi, Tokyo (JP); Kazuei Hironaka, Tokyo (JP)

(73) Assignee: HITACHI VANTARA, LTD., Kanagawa-Ken (JP)

( * ) Notice: Subject to any disclaimer, the term of this patent is extended or adjusted under 35 U.S.C. 154(b) by 46 days.

(21) Appl. No.: 18/599,454

(22) Filed: Mar. 8, 2024

(65) Prior Publication Data

US 2025/0021246 A1     Jan. 16, 2025

(30) Foreign Application Priority Data

Jul. 10, 2023     (JP) ................................. 2023-113357

(51) Int. Cl.
*G06F 3/06* (2006.01)
*G06F 11/1446* (2026.01)

(52) U.S. Cl.
CPC .......... *G06F 3/0631* (2013.01); *G06F 3/0604* (2013.01); *G06F 3/0683* (2013.01); *G06F 11/1451* (2013.01)

(58) Field of Classification Search
CPC .... G06F 3/0631; G06F 3/0635; G06F 3/0604; G06F 3/0611; G06F 3/0612; G06F 3/0683; G06F 11/1448; G06F 11/1451; G06F 11/1456; G06F 11/1466; G06F 11/1464; G06F 11/1469
See application file for complete search history.

(56) References Cited

U.S. PATENT DOCUMENTS

| | | | |
|---|---|---|---|
| 7,496,723 B1 | 2/2009 | Hanavan, III | |
| 10,001,933 B1 * | 6/2018 | Johnson | ................ G06F 3/0665 |
| 2009/0070528 A1 * | 3/2009 | Bartfai | ................ G06F 11/2082 |
| | | | 711/114 |

* cited by examiner

*Primary Examiner* — Khoa D Doan
(74) *Attorney, Agent, or Firm* — Volpe Koenig

(57) ABSTRACT

When executing a data transfer process between one volume and a second storage unit, a computer resource activation unit activates one or more computer resources that executes the data transfer process, and mounts one common volume as a transfer source or a transfer destination in the data transfer process on any of the activated computer resources. A region allocation unit allocates a part of the data transfer process to the computer resource for each storage region. The computer resource executes the part of the data transfer process between the second storage unit and the storage region allocated to the computer resource in the one common volume.

15 Claims, 25 Drawing Sheets

Figure 1:
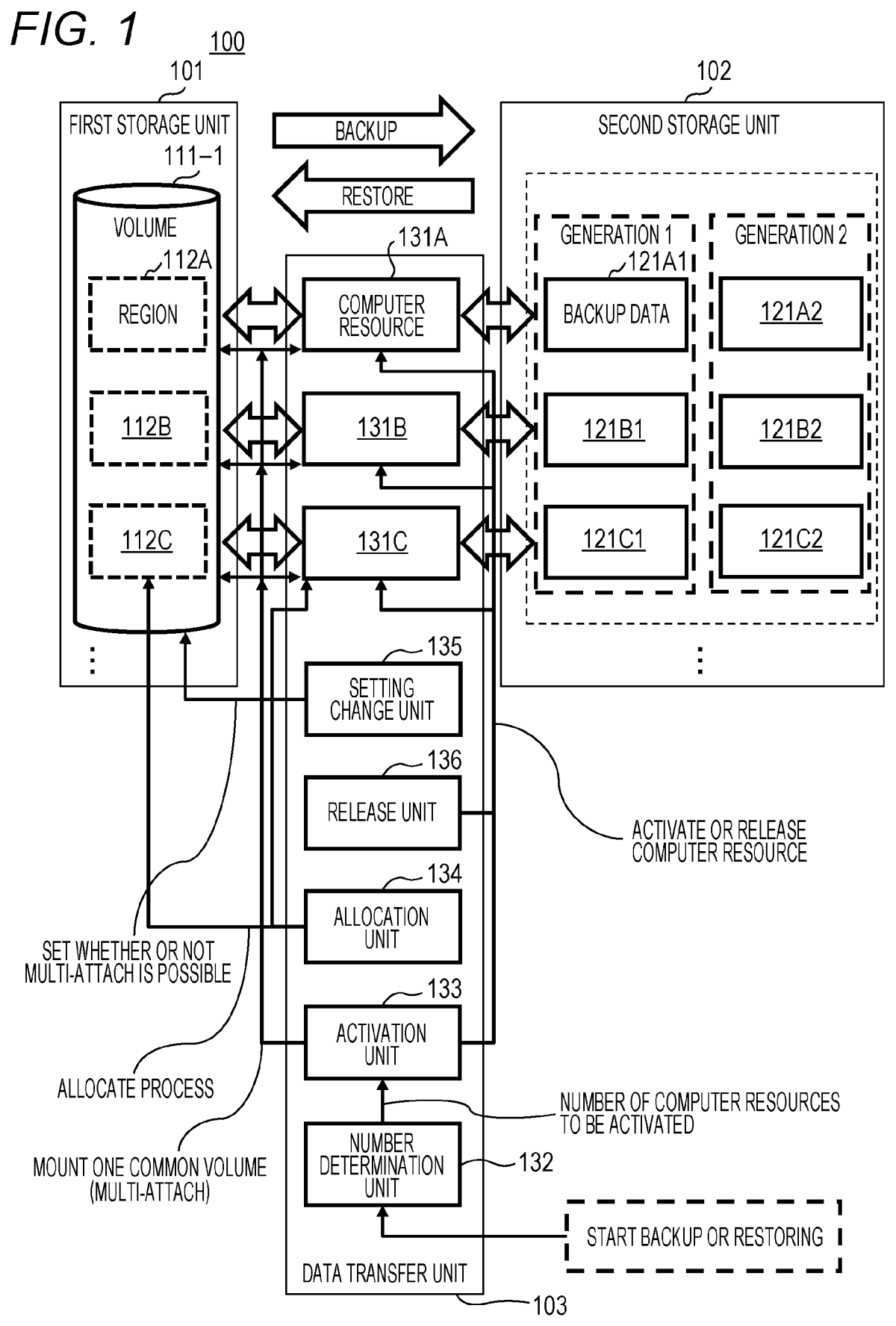

FIRST STORAGE UNIT

111-1

VOLUME

112A

REGION

112B

112C

BACKUP

RESTORE

102

SECOND STORAGE UNIT

GENERATION 1

121A1

BACKUP DATA

GENERATION 2

121A2

131A

COMPUTER RESOURCE

131B

131C

121B1

121C1

121B2

121C2

135

SETTING CHANGE UNIT

136

RELEASE UNIT

134

ALLOCATION UNIT

133

ACTIVATION UNIT

132

NUMBER DETERMINATION UNIT

ACTIVATE OR RELEASE COMPUTER RESOURCE

NUMBER OF COMPUTER RESOURCES TO BE ACTIVATED

SET WHETHER OR NOT MULTI-ATTACH IS POSSIBLE

ALLOCATE PROCESS

MOUNT ONE COMMON VOLUME (MULTI-ATTACH)

START BACKUP OR RESTORING

DATA TRANSFER UNIT

Figure 3:
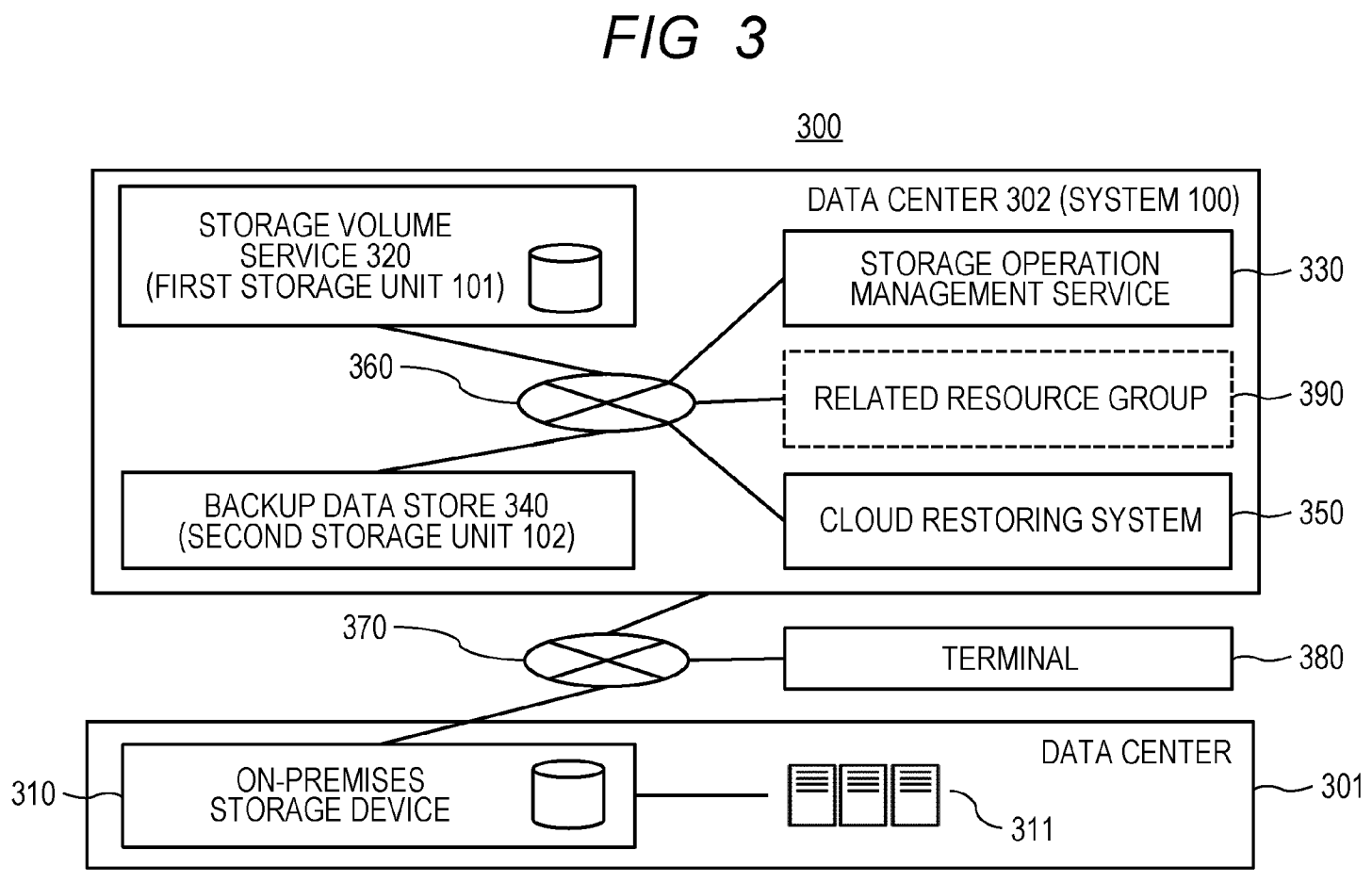

DATA CENTER 302 (SYSTEM 100)

STORAGE OPERATION MANAGEMENT SERVICE — 330

RELATED RESOURCE GROUP — 390

CLOUD RESTORING SYSTEM — 350

TERMINAL — 380

STORAGE VOLUME SERVICE 320 (FIRST STORAGE UNIT 101)

360

BACKUP DATA STORE 340 (SECOND STORAGE UNIT 102)

370

DATA CENTER — 301

311

ON-PREMISES STORAGE DEVICE

| OBJECT NAME: catalog-7f-001-0.dat | |
|---|---|
| 910 | DEVICE MODEL NUMBER | VSP56342 |
| 911 | VOLUME NUMBER | 0x7f |
| 912 | VOLUME SIZE | 16.0TB |
| 913 | VOLUME NAME | "Volume B" |
| 914 | BACKUP GENERATION NUMBER | 01 |
| 915 | BACKUP ACQUISITION TIME POINT | 2021-04-28 00:00 |
| 916 | PARENT-GENERATION CATALOG NAME | — |
| 917 | NUMBER OF DIFFERENCE MANAGEMENT BITMAPS | 512 |

OBJECT NAME: catalog-7f-002-0.dat

| | |
|---|---|
| 910 — DEVICE MODEL NUMBER | VSP56342 |
| 911 — VOLUME NUMBER | 0x7f |
| 912 — VOLUME SIZE | 16.0TB |
| 913 — VOLUME NAME | "Volume B" |
| 914 — BACKUP GENERATION NUMBER | 02 |
| 915 — BACKUP ACQUISITION TIME POINT | 2021-04-28 03:00 |
| 916 — PARENT-GENERATION CATALOG NAME | vsp56342-v7-001/catalog-7f-001-0.dat |
| 917 — NUMBER OF DIFFERENCE MANAGEMENT BITMAPS | 512 |

330 — STORAGE OPERATION MANAGEMENT SERVICE

S1301 — ACQUIRE OBJECT KEY OF CATALOG

S1302 — CREATE RESTORATION DESTINATION LOGICAL VOLUME

S1303 — ACQUIRE ACCESS END-POINT INFORMATION

S1304 — ASSIGN ACCESS AUTHORITY FOR BACKUP DATA STORE TO RESTORING SYSTEM

S1305 — INSTRUCT RESTORING SYSTEM TO PERFORM RESTORATION

END

FIG. 14

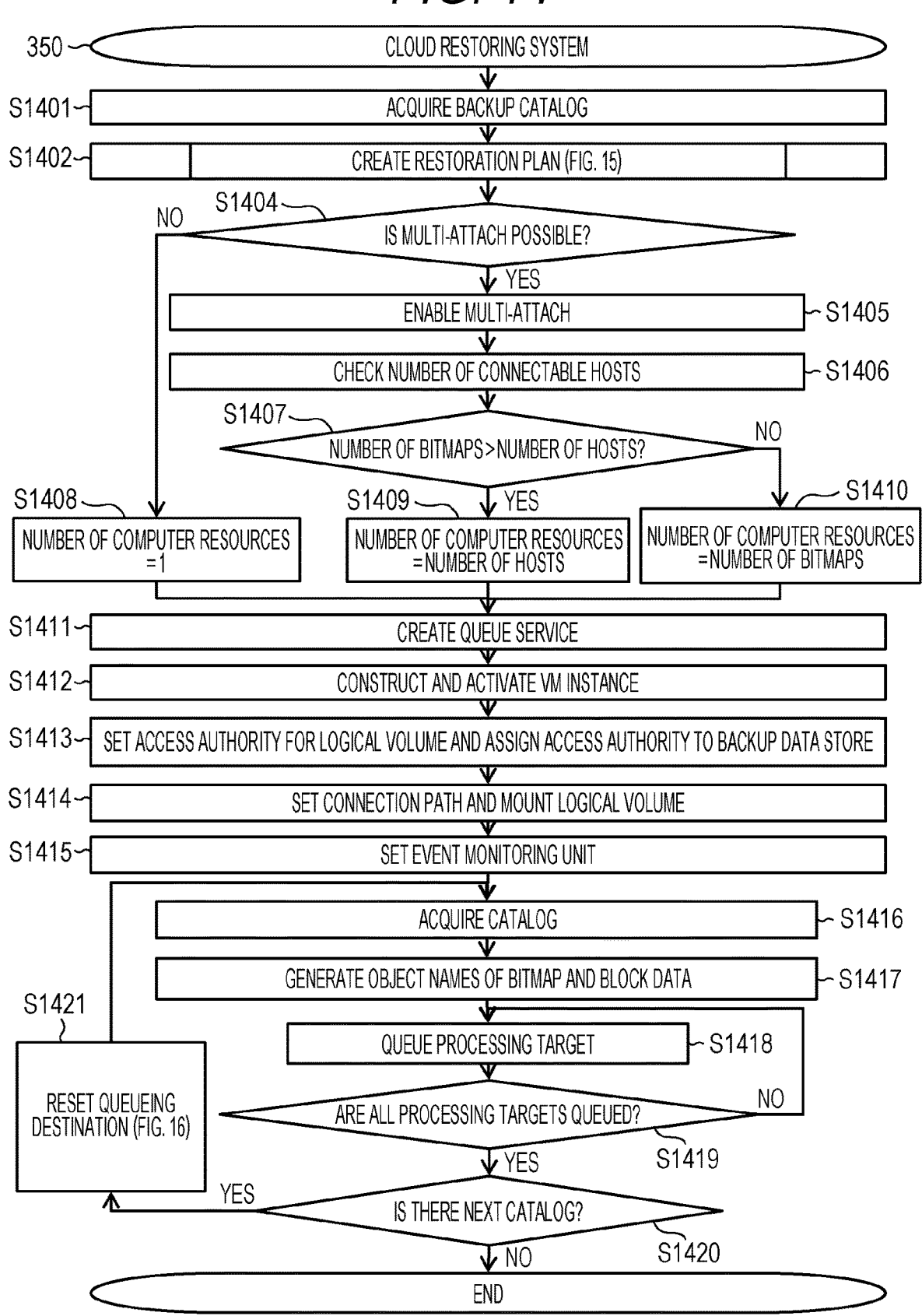

350 — CLOUD RESTORING SYSTEM

S1401 — ACQUIRE BACKUP CATALOG

S1402 — CREATE RESTORATION PLAN (FIG. 15)

S1404 — IS MULTI-ATTACH POSSIBLE?

NO

YES

ENABLE MULTI-ATTACH — S1405

CHECK NUMBER OF CONNECTABLE HOSTS — S1406

S1407 — NUMBER OF BITMAPS > NUMBER OF HOSTS?

NO

S1408 — NUMBER OF COMPUTER RESOURCES =1

S1409 — YES — NUMBER OF COMPUTER RESOURCES =NUMBER OF HOSTS

S1410 — NUMBER OF COMPUTER RESOURCES =NUMBER OF BITMAPS

S1411 — CREATE QUEUE SERVICE

S1412 — CONSTRUCT AND ACTIVATE VM INSTANCE

S1413 — SET ACCESS AUTHORITY FOR LOGICAL VOLUME AND ASSIGN ACCESS AUTHORITY TO BACKUP DATA STORE

S1414 — SET CONNECTION PATH AND MOUNT LOGICAL VOLUME

S1415 — SET EVENT MONITORING UNIT

ACQUIRE CATALOG — S1416

GENERATE OBJECT NAMES OF BITMAP AND BLOCK DATA — S1417

QUEUE PROCESSING TARGET — S1418

S1421 — RESET QUEUEING DESTINATION (FIG. 16)

ARE ALL PROCESSING TARGETS QUEUED?

NO

YES

S1419

IS THERE NEXT CATALOG?

YES

NO

S1420

END

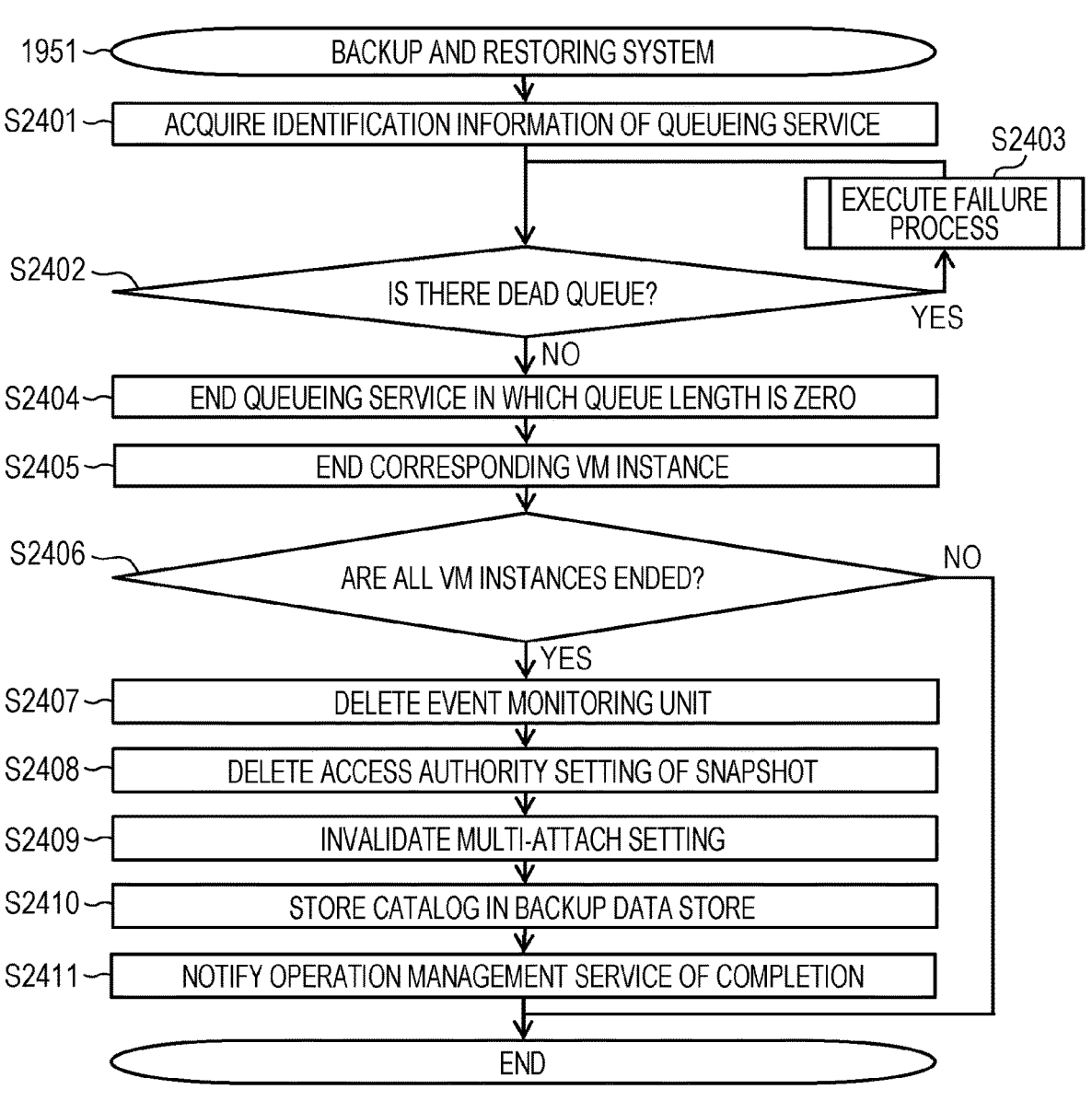

1951 — BACKUP AND RESTORING SYSTEM

S2401 — ACQUIRE IDENTIFICATION INFORMATION OF QUEUEING SERVICE

S2403 — EXECUTE FAILURE PROCESS

S2402 — IS THERE DEAD QUEUE?    YES

NO

S2404 — END QUEUEING SERVICE IN WHICH QUEUE LENGTH IS ZERO

S2405 — END CORRESPONDING VM INSTANCE

S2406 — ARE ALL VM INSTANCES ENDED?    NO

YES

S2407 — DELETE EVENT MONITORING UNIT

S2408 — DELETE ACCESS AUTHORITY SETTING OF SNAPSHOT

S2409 — INVALIDATE MULTI-ATTACH SETTING

S2410 — STORE CATALOG IN BACKUP DATA STORE

S2411 — NOTIFY OPERATION MANAGEMENT SERVICE OF COMPLETION

END

SYSTEM, METHOD, AND PROGRAM FOR DATA TRANSFER PROCESS

BACKGROUND OF THE INVENTION

1. Field of the Invention

The present disclosure relates to a technique for executing a data transfer process on data of a volume.

2. Description of the Related Art

In recent years, an operation form called a hybrid cloud in which an on-premises IT asset and a public cloud service are used in combination according to cost and application has appeared. Compared with the on-premises IT asset, the public cloud is characterized in that necessary computer resources can be flexibly utilized by a metered amount charge.

A typical public cloud service includes an object store that stores data in an object storage format and accesses the data with a representational state transfer application interface (REST API). In the object store, almost unlimited capacity can be used at low bit cost without a prior capacity design. Thus, the object store may be used for backup or archiving of data.

Further, a utilization method of offloading some of operations on an on-premises system constructed in a data center of a user by restoring backed-up data in an environment constructed by using a cloud computing service or a cloud storage service, or a utilization method of using some of the operations as a recovery destination site (secondary site) when a disaster occurs is known.

When such a service or storage as described above is used, a data transfer process (for example, a backup process or a restoration process) is involved. U.S. Pat. No. 7,496,723 discloses a method of providing a data mover and performing data transfer between storages without passing through a host, as a processing speed-up method in a backup process.

SUMMARY OF THE INVENTION

Generally, data transfer takes time. Therefore, in order to offload some of the operations or to quickly use some of the operations as the secondary site at the time of a disaster, it is important to enable a data transfer process (for example, a backup process or a restoration process) in a short time. In particular, recently, the amount of data that is a target of the data transfer process has dramatically increased, and thus speeding up the data transfer process has become an increasingly important issue.

On the other hand, a broadband storage has been provided as a storage as a transfer destination or a transfer source in the data transfer process (for example, a transfer destination in the backup process or a transfer source in the restoration process). For example, the band of the object store described above is a broadband that cannot be used up by one computer resource.

U.S. Pat. No. 7,496,723 discloses a method of transferring data in a volume-to-volume manner by using a data mover without passing through a host, but does not disclose a method in which a plurality of data movers divide and handle a data transfer process related to one volume. Therefore, in the technique of U.S. Pat. No. 7,496,723, it takes time according to the amount of data to be transferred, that is, the volume size. U.S. Pat. No. 7,496,723 does not clearly disclose processing performance (data transfer performance)

of the data mover. However, in a case where the data mover is applied to a broadband storage (for example, the object store described above), the data transfer speed provided by the data mover is not sufficient if the data mover has performance corresponding to one computer resource.

U.S. Pat. No. 7,496,723 also fails to disclose a method or control for temporarily increasing or decreasing the configuration of the computer resources according to the amount of data to be transferred or the required speed of data transfer. Therefore, in the technique of U.S. Pat. No. 7,496, 723, it is difficult to change the configuration of the data mover according to the volume size.

In view of the above description, an object of the present disclosure is to speed up a data transfer process. Another object of the present disclosure is to speed up the data transfer process by sufficiently utilizing a bandwidth of a storage as a transfer destination or a transfer source in the data transfer process. Still another object of the present disclosure is to construct a computer resource according to a required transfer capability by adjusting a configuration of the computer resource for executing a data transfer process according to an amount of data to be transferred in the data transfer process or a required speed of the data transfer process.

In order to achieve at least one of the above objects, features of the present disclosure are, for example, as follows.

A system includes a first storage unit, a second storage unit, and a data transfer unit. The first storage unit includes a volume for storing data. One volume includes one or more storage regions. The data transfer unit includes a computer resource activation unit and a region allocation unit. When executing a data transfer process between one volume and the second storage unit, the computer resource activation unit activates one or more computer resources that execute a data transfer process, and mounts one common volume as a transfer source or a transfer destination in the data transfer process on any of the activated computer resources. Mounting the volume on the computer resource includes causing the computer resource to recognize the volume and enabling the computer resource to access data of the volume. The region allocation unit allocates the data transfer process to the computer resource for each storage region. The computer resource executes the data transfer process between the second storage unit and the storage region allocated to the computer resource in the one common volume.

As described above, in the present disclosure, one common volume as a transfer source or a transfer destination in a data transfer process can be mounted on one or more computer resources that execute the data transfer process, and the data transfer process can be executed in parallel on each of the computer resources. Thus, the data transfer process can be speeded up. In addition, as described above, in the present disclosure, even though a bandwidth of the second storage unit which is a storage as the transfer destination or the transfer source in the data transfer process is wide, the bandwidth of the storage can be sufficiently utilized because one or more computer resources access the storage in parallel. Furthermore, as described above, in the present disclosure, the data transfer process is allocated to the computer resource for each storage region in one common volume as the transfer source or the transfer destination in the data transfer process. Thus, the computer resource according to the transfer capability required for the data transfer process can be constructed.

A method and a program for realizing processing similar to the processing realized by the above system can also obtain similar actions and effects to those of the above system. Furthermore, according to the aspect of the program, costs are reduced in many cases. In the program, design change related to the processing is also easily performed.

Features that can be included in the present disclosure other than the above description, and actions and effects corresponding to the features are disclosed in the specification, claims, or drawings.

BRIEF DESCRIPTION OF THE DRAWINGS

FIG. 1 illustrates a functional configuration of an embodiment of the present disclosure;

FIG. 3 illustrates a system configuration of a first embodiment (restoration process) of the present disclosure;

FIG. 4 illustrates an on-premises data center;

FIG. 9A illustrates a first-generation backup catalog;

FIG. 9B illustrates a second-generation backup catalog;

FIG. 10 illustrates a storage volume service (first storage unit);

FIG. 14 illustrates processing performed by the restoring system at the time of restoration;

FIG. 19 illustrates a system configuration of a second embodiment (backup process) of the present disclosure;

FIG. 24 illustrates processing when a queue length is zero in backup.

DESCRIPTION OF THE INVENTION

Figure 2:
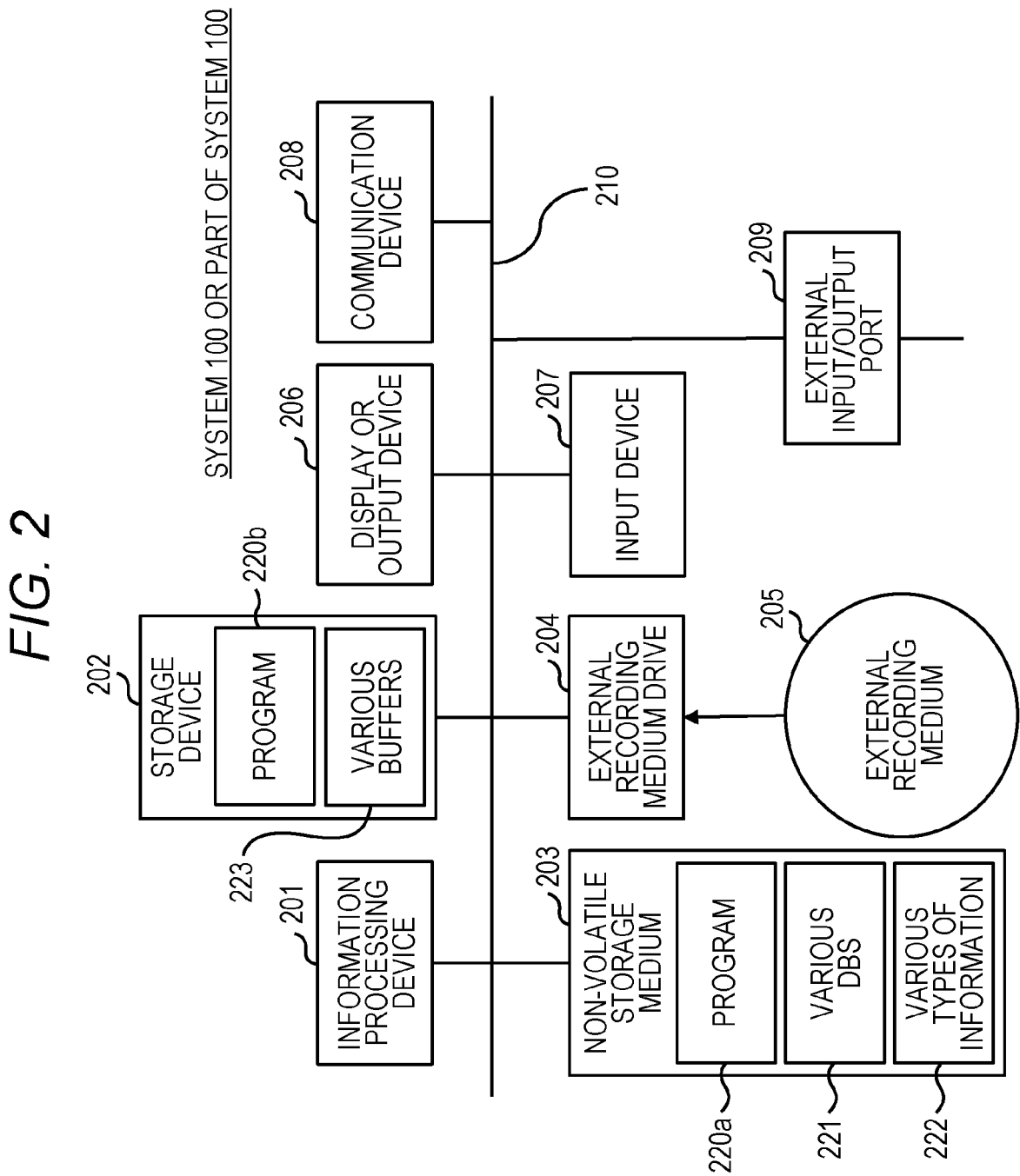
FIG. 2 illustrates a computer architecture for realizing the embodiment of the present disclosure.

Preferred embodiments of the present invention will be described in detail below with reference to the accompanying drawings. Embodiments described below do not limit the disclosure according to the claims, and all of the elements described in the embodiments and combinations thereof are not necessarily essential to the solution of the present disclosure. The following description and drawings are examples for describing the present disclosure, and will include omissions and simplifications as appropriate for clarity of description. The present disclosure can be realized in various other forms. Unless otherwise specified, each component may be singular or plural. Positions, sizes, shapes, ranges, and the like of components illustrated in the drawings may not represent actual positions, sizes, shapes, ranges, and the like in order to facilitate the understanding of the invention. Therefore, the present disclosure is not necessarily limited to the positions, sizes, shapes, ranges, and the like disclosed in the drawings.

Each of a system, a service, a device, and a unit in the present disclosure may be integrated into one in terms of hardware, or may be divided into a plurality of parts and the parts may play roles in cooperation with each other. Several systems, services, devices, or units may be integrated in terms of hardware. Each of the systems, the devices, or the units may be realized by causing a computer to execute software (a program) (as in FIG. 2). Some of the functions of the system, the service, the device, or the unit may be realized in hardware (for example, hard-wired logic or FPGA), and the remaining functions may be realized by executing software (program). All of the functions of the system, the service, the device, or the unit may be realized in terms of hardware. Some or all of the steps of the processing illustrated in the flowchart or the like described in the present disclosure may be realized in terms of hardware.

The program in the present disclosure may be included in a concept including a general program corresponding to software, in which software and hardware resources cooperate with each other to construct a specific information processing device according to a use purpose or an operation method thereof. That is, the program in the present disclosure is not limited to a program of a specific type or aspect. In addition, the program may be initially recorded in a compressed format.

In the drawings, similar reference signs are used to indicate similar components. In the drawings illustrating the flowcharts described below, rectangular boxes indicate the steps of processing and diamond-shaped boxes indicate the steps of conditional branching. In the drawings illustrating the flowcharts, "step" is abbreviated as "S". In addition, the state of the screen illustrated in the drawings described below is an example, and is not limited thereto.

Hereinafter, a first embodiment and a second embodiment will be described as embodiments of the present disclosure. Among the embodiments, the functional configuration will be collectively described in "1. Functional configuration of embodiment of present disclosure". A computer architecture for realizing the embodiments will be collectively described in "2. Computer architecture for realizing embodiments of present disclosure". The description of the system configuration and the description of the processing will be given separately for each embodiment.

1. Functional Configuration of Embodiment of Present Disclosure

FIG. 1 illustrates a functional configuration of the embodiment of the present disclosure. Not all the functional components illustrated in FIG. 1 are essential.

In FIG. 1, a system 100 includes a first storage unit 101, a second storage unit 102, and a data transfer unit 103. The data transfer unit 103 is provided for executing a data transfer process (for example, a backup process of transferring data from the first storage unit 101 to the second storage unit 102, or a restoration process of transferring data from the second storage unit 102 to the first storage unit 101) between the first storage unit 101 and the second storage unit 102. The first storage unit 101 includes one or more volumes 111 for storing data. One volume 111 includes one or more storage regions. This storage region is also referred to as a management region 112 in a case where the storage region is accompanied by first management information or second management information to be described later. (In the drawings, "storage region" or "management region" is abbreviated as "region"). The data transfer unit 103 may include a computer resource number determination unit 132 ("computer resource number determination unit" is abbreviated as "number determination unit" in the drawings). When the data transfer process is executed between one volume 111 and the second storage unit 102, the computer resource number determination unit 132 determines the number of computer resources that execute the data transfer process, and transmits the number to a computer resource activation unit 133 to be described later. The data transfer unit 103 includes the computer resource activation unit 133 ("computer resource activation unit" is abbreviated as "activation unit" in the drawings). The computer resource activation unit 133 activates computer resources of the number determined by the computer resource number determination unit 132. In the example of FIG. 1, the computer resource activation unit 133 constructs (activates) three computer resources 131. The computer resource activation unit 133 mounts one common volume 111 as a transfer source or a transfer destination in the data transfer process on any of the activated computer resources 131. Here, mounting the volume 111 on the computer resource 131 includes causing the computer resource 131 to recognize the volume 111 and enabling the computer resource 131 to access data of the volume 111. In a case where the backup process is executed a plurality of times (for a plurality of generations), the second storage unit 102 may store backup data 121 for each combination of the generation and the storage region (management region). The data transfer unit 103 includes a region allocation unit 134 ("region allocation unit" is abbreviated as "allocation unit" in the drawings). The region allocation unit 134 allocates the data transfer process to the computer resource 131 for each storage region or management region 112. The example of FIG. 1 illustrates that the computer resource activation unit 133 constructs (activates) three computer resources 131, and the region allocation unit 134 allocates the data transfer process to the constructed (activated) three computer resources 131 for each storage region or management region 112. The computer resource 131 executes the data transfer process between the second storage unit 102 and the storage region or management region 112 allocated to the computer resource 131 in the one common volume 111. The data transfer unit 103 may include a setting change unit 135. When one common volume 111 is mounted on a plurality of computer resources 131, the setting change unit 135 changes the setting of the one common volume 111 to a multi-attachable disk type. When the data transfer process is completed, the setting of the one common volume 111 is brought back to a non-multi-attachable disk type. The data transfer unit 103 may include a computer resource release unit 136 ("computer resource release unit" is abbreviated as "release unit" in the drawings). Here, the computer resource 131 may be a temporary computer resource. Even before the entirety of the data transfer process is completed, the computer resource release unit 136 releases the computer resource 131 which is the temporary computer resource that has completed the allocated data transfer process.

In a case where the data transfer process includes data transfer processes of a plurality of generations for each storage region or management region 112 as a transfer source or a transfer destination in the data transfer process, the region allocation unit 134 may allocate data transfer processes of a plurality of generations related to the same storage region or management region 112 to the same computer resource 131 in the data transfer process. The computer resource 131 may execute the data transfer processes of the plurality of generations related to the same storage region or management region 112 in order of a normal processing result.

The system 100 in the present disclosure has the functional configuration as described above, and thus can have the effects described in [SUMMARY OF THE INVENTION] described above.

The system 100 in the present disclosure can set the setting of the volume to a multi-attachable setting only for a necessary period, and thus security strength regarding an access to the volume can be increased. In a case where the degree of charging is determined by the setting content of the volume, the system 100 can suppress the cost when the volume is used, by setting the setting of the volume to the multi-attachable setting only for the necessary period.

The system 100 in the present disclosure can sequentially release the computer resources that have completed the allocated data transfer processes. Thus, it is possible to provide the computer resources corresponding to the change in the situation.

In addition, the system 100 in the present disclosure can execute the data transfer process such that the processing result becomes normal in a case where the data transfer process includes data transfer processes of a plurality of generations for each storage region or management region 112 as the transfer source or the transfer destination in the data transfer process.

2. Computer Architecture for Realizing Embodiment of Present Disclosure

FIG. 2 illustrates a computer architecture for realizing the embodiment of the present disclosure.

In order to realize the system 100, some or all of an information processing device (for example, a CPU) 201, a storage device (for example, a memory) 202, a non-volatile recording medium (for example, a non-volatile memory and a non-volatile disk device) 203, an external recording medium drive (for example, a disk drive) 204, a display or output device (for example, a display and a printer) 206, an input device (for example, a mouse, a keyboard, an imaging device, and a sensor) 207, a communication device (for example, a wired-communication communication device or a wireless-communication communication device. The communication device may be a network interface device (NIC) that controls communication with other systems, services, devices, or servers according to a predetermined protocol) 208, and an external input/output port 209 may be interconnected by an interconnection unit (for example, a bus or a crossbar switch) 210.

The non-volatile recording medium 203 may record a program 220a and various pieces of information. As the various pieces of information, for example, various databases (DB) 221 or various types of information 222 may be recorded in the non-volatile recording medium 203. Instead of this, some or all of the above-described program or various pieces of information may be acquired (accessed) from the outside of FIG. 2. An external recording medium (for example, a portable recording disk (DVD or the like), an IC card, or an SD card) 205 can be connected to the external recording medium drive 204. The program 220a and the various pieces of information described above may be transferred from the external recording medium 205 and stored in the non-volatile recording medium 203 and the storage device 202. The program 220a and the various pieces of information described above may be provided via the communication device 208, the external input/output port 209, or the input device 207, and be stored in the non-volatile recording medium 203 or the storage device 202.

The program 220a may be loaded into the storage device 202 (for example, from the non-volatile recording medium 203) in order for the architecture of FIG. 2 to function as the system 100, a service, a device, each unit (functional unit), or a part of each unit in the system 100 (execute one or a series of processes (steps)). The program that has been loaded is indicated by 220b in FIG. 2. An information processing device 201 may execute the program 220b (also by using various pieces of information in the non-volatile recording medium 203 or the like as necessary). By execution of the program 220b, the functions of the system 100, the service, the device, each unit (functional unit), or a part of each unit in the system 100 are realized (one or a series of processes (steps) are executed). At this time, various buffers 223 temporarily formed in the storage device 202 may also be appropriately used.

3. First Embodiment (Restoration Process) of Present Disclosure

A first embodiment has a configuration for restoring backed-up data to a logical volume (an example of the volume) on a cloud in a short time. An example in which a temporary computer resource is used as the computer resource for executing the restoration process will be described below.

3-1. System Configuration of First Embodiment (Restoration Process) of Present Disclosure 3-1-1. System Configuration of Computer System Including System of Present Disclosure FIG. 3 illustrates a system configuration of a computer system 300 including a system 100 according to the first embodiment of the present disclosure. The computer system 300 illustrated in FIG. 3 includes a data center 301 that is an on-premises side for a terminal 380 and performs main operations, and a data center 302 that is a cloud side for the terminal 380 and serves as a transfer destination in the backup process or a transfer destination in the restoration process. The data center 301 is, for example, an on-premises system owned by a user as an IT asset, and includes an on-premises storage device 310 and a server group 311. The data center 302 is, for example, a virtual data center provided by a public cloud service provider. The data center 302 includes a storage volume service 320, a storage operation management service 330, a backup data store 340, a cloud restoring system 350, an internal network 360 that interconnects these services, and a related resource group 390 that is temporarily constructed and used. The related resource group 390 is a computer resource that is temporarily constructed and used for processing, and includes, for example, a computer instance such as a virtual computer or a container, and a peripheral service such as a queue service or an event monitoring unit. The data center 301, the data center 302, and the terminal 380 are connected to each other by an appropriate network 370. The network 370 is, for example, the Internet or an IP-dedicated line. The user can access devices and services of both data centers by using the terminal 380. The terminal 380 is, for example, a PC or a portable terminal. The data centers 301 and 302 and the terminals 380 may be interconnected via another type of network instead of the network 370 illustrated in FIG. 3 or in addition to the network 370.

The data center 302, the storage volume service 320, and the backup data store 340 in FIG. 3 are associated with the system 100, the first storage unit 101, and the second storage unit 102 in FIG. 1, respectively. A part or all of the cloud restoring system 350 and the related resource group (computer resource) 390 in FIG. 3 is associated with the data transfer unit 103 in FIG. 1. A part of the storage operation management service 330 of FIG. 3 may also be included in the data transfer unit 103 of FIG. 1.

As described above, the present disclosure can be effectively utilized in a cloud service.

3-1-2. In-Device Configuration of On-Premises Storage Device

Figure 4:
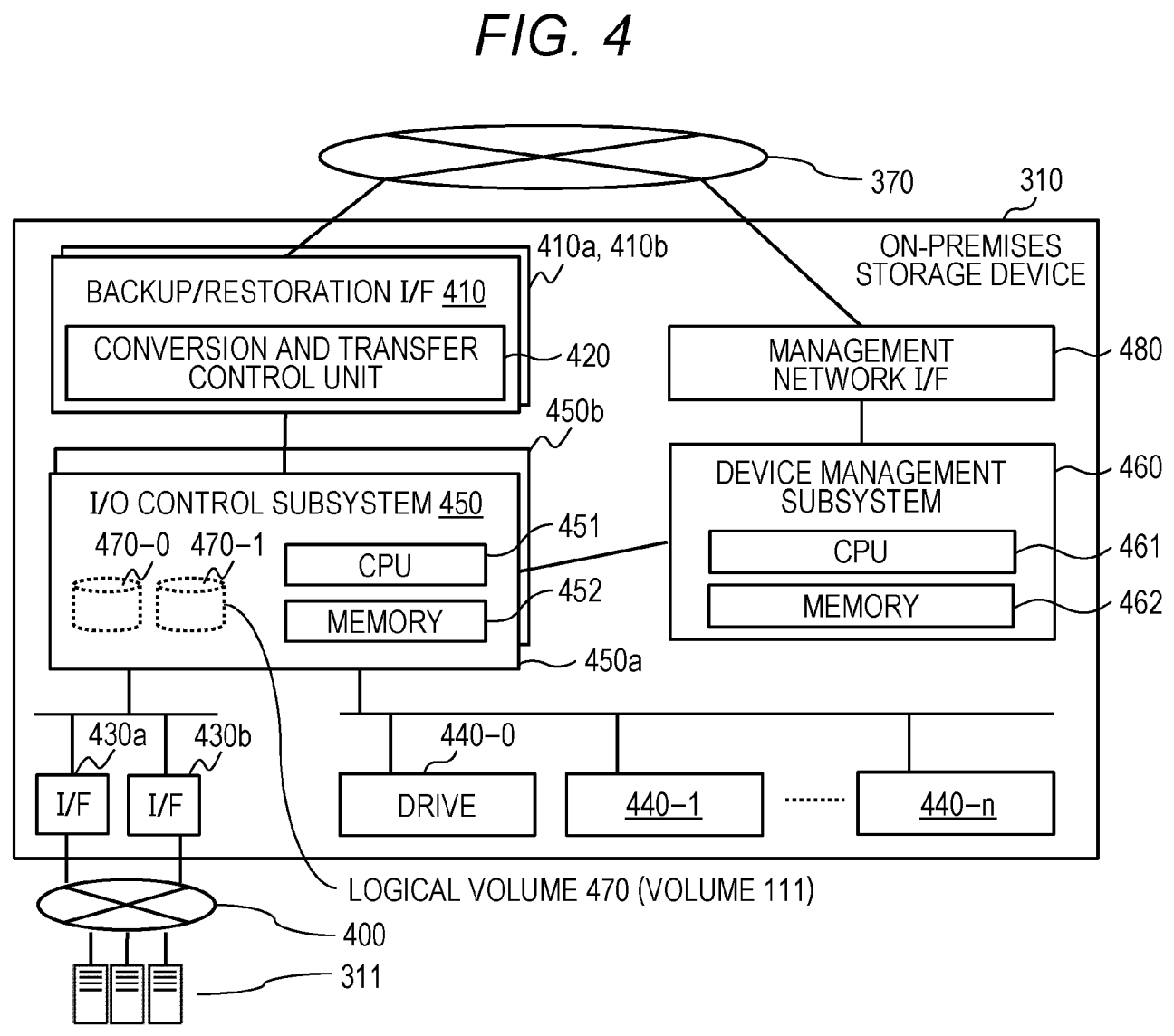

FIG. 4 illustrates an in-device configuration of the on-premises storage device 310. The on-premises storage device 310 includes a plurality of redundant I/O control subsystems 450 (450a and 450b), a device management subsystem 460, a plurality of host interfaces (I/Fs) 430 (430a and 430b), a plurality of drives 440 (440-0 to 440-n), a management network interface (I/F) 480, and a plurality of backup/restoration interfaces (I/Fs) 410 (410a and 410b). The host interface 430 is provided for communicating with the server group 311 via the storage network 400. The server group 311 performs read/write I/O to a logical volume 470 through the host interface 430. The drive 440 is a physical storage device such as a solid state drive (SSD) or a hard disk drive (HDD). The management network interface 480 communicates with the terminal 380 via the network 370 and also communicates with the storage operation management service 330. The I/O control subsystem 450 configures logical volumes 470 (470-0 and 470-1) based on a storage region of the connected drive 440 and provides the logical volume to the server group 311. The I/O control subsystem 450 issues read/write I/O for the drive 440 and executes an I/O process based on the read/write I/O for the logical volume 470, which has been issued from the server group 311. In addition, the I/O control subsystem 450 manages the logical volume 470 in units of a predetermined logical block size (for example, 8 kilobytes) and records where data has been written. The I/O control subsystem 450 includes a processor (CPU) 451 and a memory 452. The processor 451 executes various processes as described above according to a program stored in the memory 452. The memory 452 is, for example, a random access memory (RAM), and stores a program executed by the processor 451 and necessary information. The device management subsystem 460 executes a process of performing various settings and monitoring of the on-premises storage device 310. The device management subsystem 460 receives a user operation instruction from the terminal 380 via the network 370 and the management network interface 480. The device management subsystem 460 executes various processes by an internal processor (CPU) 461 executing a program stored in the memory 462. The device management subsystem 460 is provided inside the on-premises storage device 310 in the example of FIG. 4, but the device management subsystem 460 may be provided outside the on-premises storage device 310. Some of the functions provided by the device management subsystem 460 may be realized by the storage operation management service 330. The backup/restoration interface 410 is connected to the backup data store 340 via the network 370 and executes the backup process of the logical volume 470. The backup/restoration interface 410 includes a data conversion and transfer control unit 420 (abbreviated as a "conversion and transfer control unit 420" in FIG. 4) for transmitting and receiving data to and from the backup data store 340. The backup/restoration interface 410 generates additional information necessary for conversion and compression of a data format, interpretation of a data configuration, and storage. When the backup process has been completed, the backup/restoration interface 410 transmits a completion notification and summary information regarding the backup content to the storage operation management service 330. The summary information may include, for example, information (for example, an object name or an object key (described later)) that may be a pointer pointing to a backup catalog (described later) corresponding to the backup process.

3-1-3. Management Region of Volume and Difference Management Bitmap (First Management Information)

A data group of each of one volume 111 in FIG. 1 and one logical volume 470 (further, one logical volumes 1070 and 2070 managed by the cloud-side data center 302 to be described later) in FIG. 4 may be divided into a plurality of management regions 112 and then managed. Each of the management regions 112 may be accompanied by first management information indicating which position of data in the management region 112 is to be set as a backup process target. A case where the logical volume 470 is used as an example of the volume and a difference management bitmap 500 is used as an example of the first management information will be mainly described below. The following description can also be applied to logical volumes 1070 and 2070 described later. The following description can also be applied to a physical volume that is not a logical volume. That is, the present disclosure is not limited to the logical volume.

Figure 5:
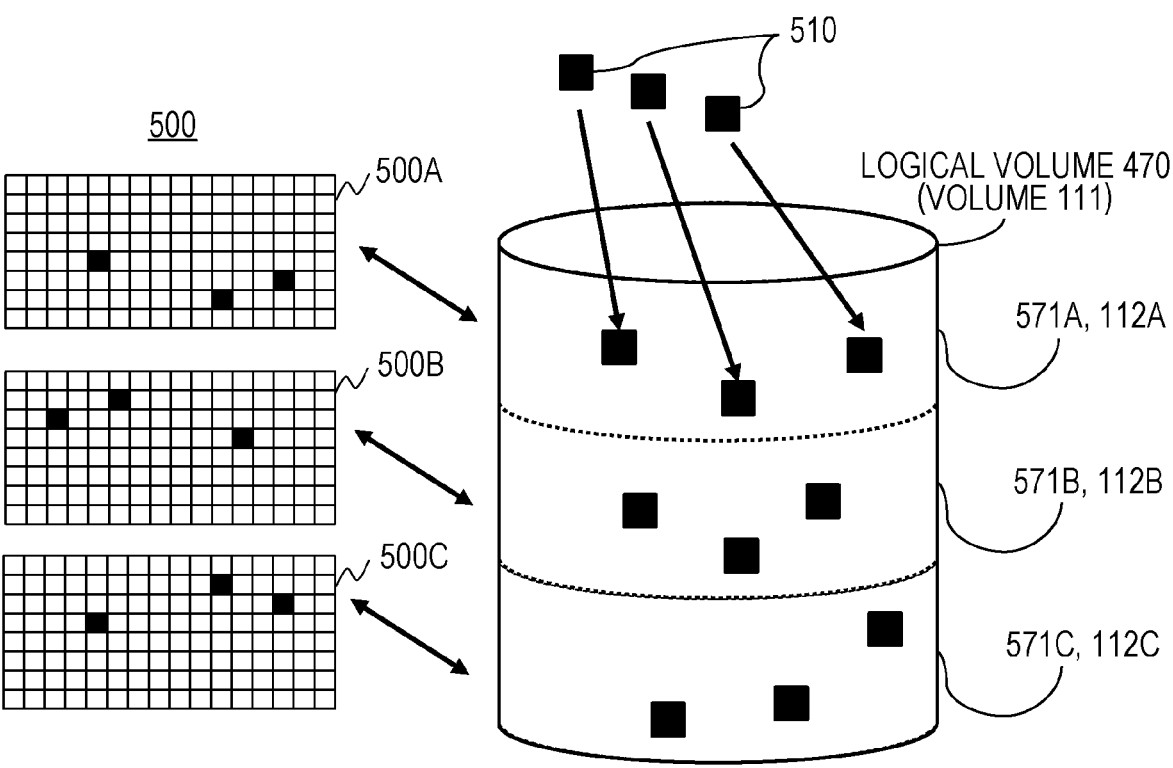
FIG. 5 illustrates a management region of a volume and a difference management bitmap (first management information)

FIG. 5 is a diagram schematically illustrating a management state of the logical volume 470 in the on-premises storage device 310. The logical volume 470 (associated with the volume 111 of FIG. 1) allocates a logical block address (LBA) for each fixed block size and manages a storage location of (write) data (block data) 510 written from the server group 311. Since the logical volume 470 generally has a large capacity, the on-premises storage device 310 is internally divided into a plurality of management regions 571A, 571B, and 571C (respectively associated with management regions 112A, 112B, and 112C in FIG. 1) (for example, for every 32 gigabytes), and causes each of the management regions to be accompanied by the first management information. The on-premises storage device 310 manages whether or not (write) data (block data) 510 is stored, by the difference management bitmap 500 (500A, 500B, and 500C) (which is one embodiment of the first management information). The difference management bitmap 500 is provided corresponding to the management regions 571A, 571B, and 571C of the logical volume 470. When new (write) data is written to the logical volume 470, a bit corresponding to a storage destination LBA of the (write) data is changed to ON (represented by a black square in FIG. 5) in the difference management bitmap 500, and the fact that the (write) data has been written is recorded in the difference management bitmap 500. The difference management bitmap 500 is replaced with a new bitmap each time a backup is acquired. That is, it is possible to determine difference data (write data) to be backed up in each generation of the backup process and a location thereof.

Some storage devices have a snapshot acquisition function (for example, a function of acquiring snapshots of block data of all LBAs included in a volume) of the volume. In this case, the storage device may alternatively create the difference management bitmap 500 by comparing snapshots of two generations. Alternatively, if the management information having the similar effect to that of the function provided by the difference management bitmap is associated with the snapshot acquisition function, the storage device may use the management information.

The storage device may be managed by another means capable of maintaining update information, such as recording a start LBA of an update portion by (write) data and a size (for example, the number of blocks) of (write) data as a list instead of the bitmap.

As described above, since the present disclosure includes the first management information (for example, the difference management bitmap 500) for each management region in the volume, data (block data) that is a target of the backup process can be specified, and it is possible to efficiently execute the backup process.

Further, the present disclosure can utilize space management in units of blocks in a logical block address space (LBA space). (In a modification example, an address not in units of blocks may be set in the volume. In such a volume, the first management information suitable for the address management may be provided).

3-1-4. Backup Setting Screen

The backup process can be set in a manner that the user or the like operates a backup setting screen displayed on the terminal 380. An example in which a transfer source of the backup process is the on-premises storage device 310 will be described below. The following description can also be applied to a case where the transfer source of the backup process is the logical volume 1070 or 2070 in a remote-side data center 302 described later.

Figure 6:
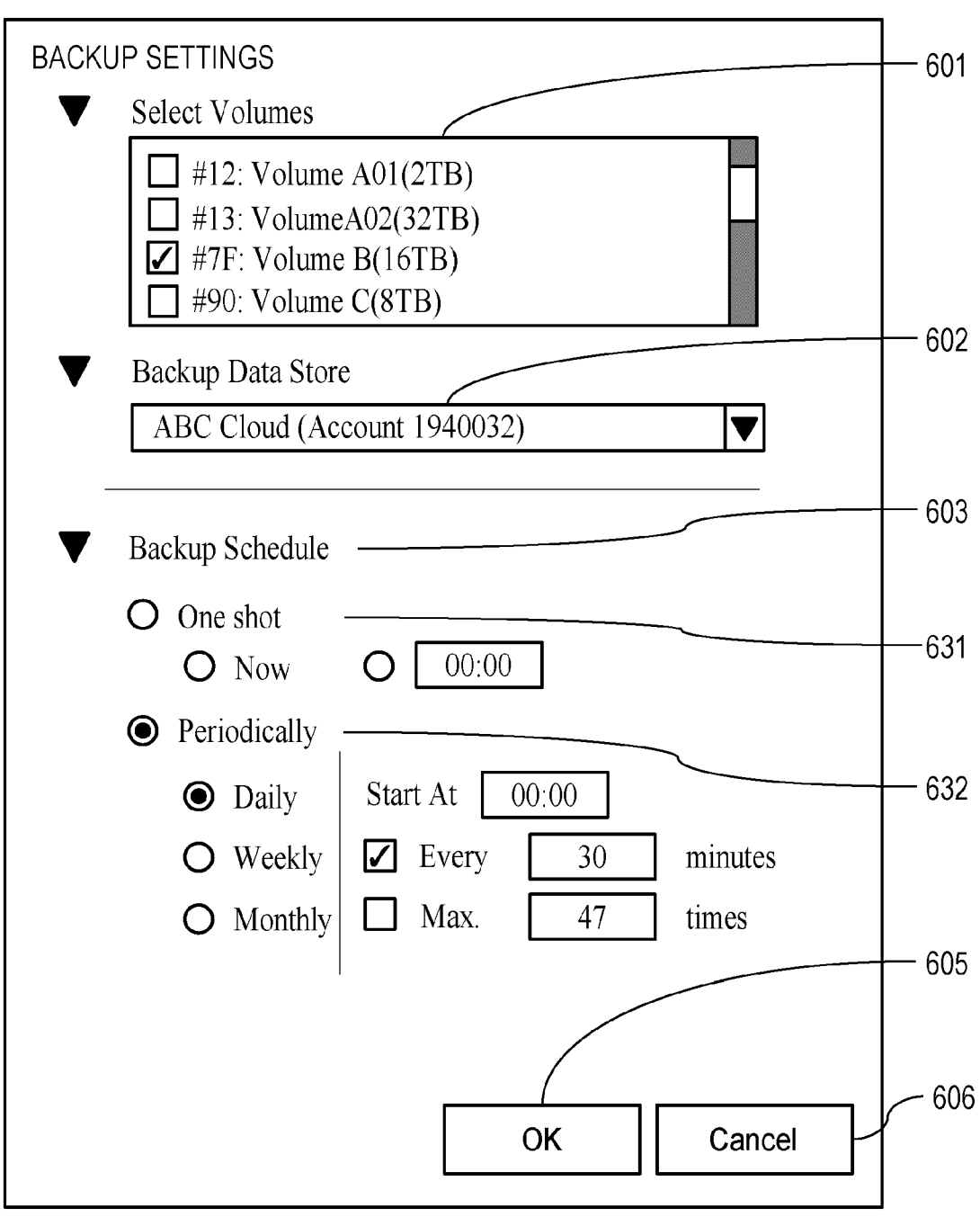
FIG. 6 illustrates a backup setting screen.

FIG. 6 is a diagram illustrating a backup setting screen 600 displayed on the terminal 380 for the on-premises storage device 310 to execute the backup process through the backup/restoration interface 410. The backup setting screen 600 is operated through the terminal 380. Information to be displayed on the backup setting screen 600 may be prepared mainly by the terminal 380, may be prepared mainly by a device other than the terminal 380 (for example, the data center 301 or the storage operation management service 330 in the data center 302), or may be prepared in cooperation by a plurality of devices.

The backup setting screen 600 includes a logical volume selection region 601, a backup data store selection region 602, and a backup schedule setting region 603. The logical volume selection region 601 is a region for selecting the logical volume 470 as a backup target. In the example of FIG. 6, the logical volume 470 of Volume B (16 terabytes) indicated by the logical volume number 7F is selected. The backup data store selection region 602 is a region that includes, for example, a drop-down box (pull-down menu), and selects the backup data store 340 as a transfer destination of the backup process of the logical volume 470. In the backup data store selection region 602, the backup data stores 340 that has been already registered by using another backup store registration screen (not illustrated) are selectively displayed. In the example of FIG. 6, the backup data store 340 (with an account name) indicated by "ABC Cloud (Account 1940032)" is selected. (The account may be given to the user or the like, for example.) The backup schedule setting region 603 is a region for setting a backup schedule. In the backup schedule setting region 603, for example, a One shot designation button 631 for setting once execution of the backup process and a Periodically designation button 632 for setting periodic execution of the backup process are displayed. In a case where the user or the like selects the One shot designation button 631, the user or the like can further designate immediate execution of the backup process (Now) or designate an execution start time point. In a case where the user or the like selects the Periodically designation button 632, the user or the like can designate a period (for example, Daily, Weekly, and Monthly) as a repeating unit. In a case where the user or the like designates the date and time (Daily), the user or the like can designate the execution start time point, an execution interval time, the maximum number of executions, and the like. For example, the user or the like may be allowed to designate only one of the execution interval time and the maximum number of executions. In a case where the maximum number of executions is designated, the on-premises storage device 310 may determine the execution interval time of the backup process so that the backup process of the maximum number of executions is executed in a state close to an equal interval within a period (Daily, Weekly, or Monthly) that is one designated unit. In the example of FIG. 6, the date and time (Daily) is designated. In a case where Weekly or Monthly is designated, a setting screen suitable for setting weekly or monthly backup process may be displayed on the backup setting screen 600. In the example of FIG. 6, the periodic execution is selected as the schedule of the backup process, and it is designated that the backup process is executed daily and the backup process is executed every 30 minutes from 0:00 every day. An OK button 605 is a button for receiving an instruction to register the schedule of the backup process set on the backup setting screen 600. When the OK button 605 is pressed, the set schedule of the backup process is registered in a scheduler of the device management subsystem 460, and information regarding the schedule is also transmitted to the storage operation management service 330. (The scheduler may be constructed by the device management subsystem 460 executing a scheduler program, for example.) In a case where the transfer source in the backup process is the logical volume 470 in the on-premises storage device 310, the processing entity of the backup process may be any of the device management subsystem 460, the I/O control subsystem 450, or the backup/restoration interface 410. In a case where the transfer source in the backup process is the logical volume 1070 or 2070 in the storage volume service 320, the processing entity of the backup process may be the storage operation management service 330.

3-1-5. Backup Process for Each Generation

In a case where a method other than the method of acquiring snapshots of all pieces of data of one volume is used when one volume (logical volume) is backed up, generation management is performed in the backup process and the restoration process. Specifically, the backup process is a difference backup process of transferring only data written to the volume as the transfer source in the backup process to the backup data store 340 which is the second storage unit 102, after a time point of the previous backup process. The restoration process is a process of executing the restoration processes of all the generations before the generation indicating the time point of restoration by the restoration process, in order from the older generation.

Figure 7A:
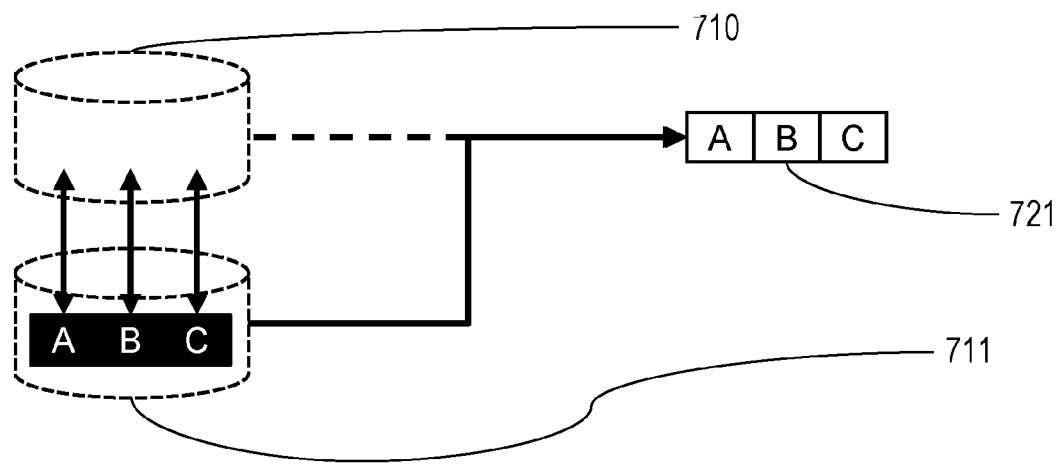
FIG. 7A illustrates a state of a first backup process.
Figure 7B:
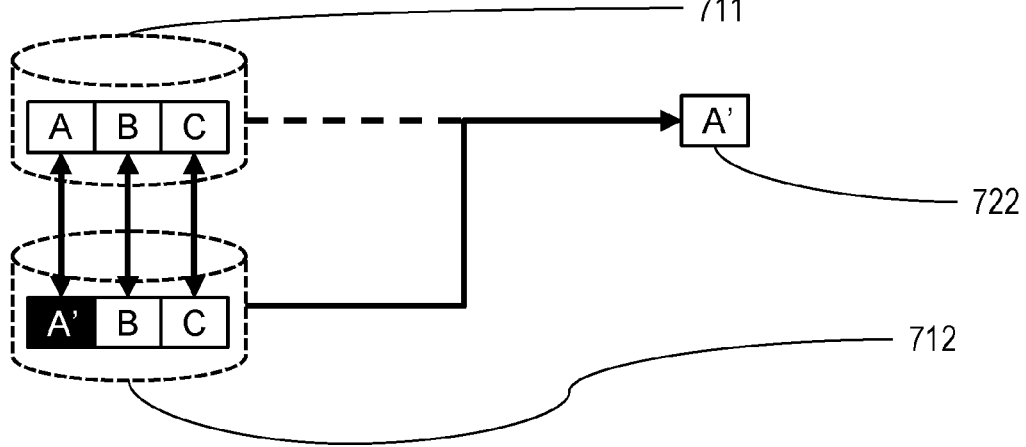
FIG. 7B illustrates a state of a second backup process.
Figure 7C:
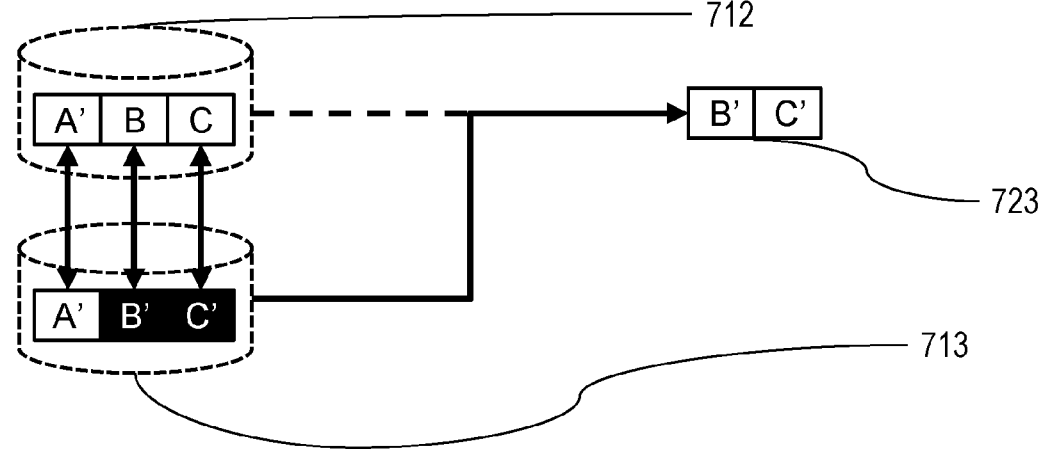
FIG. 7C illustrates a state of a third backup process.

FIGS. 7A, 7B, and 7C schematically illustrate a state in which block data groups 721, 722, and 723 to be subjected to the backup process are extracted as differences when the backup process is executed. Symbols "A", "B", and "C" are used for the description in the examples of FIGS. 7A, 7B, and 7C. In practice, whether or not these pieces of data are updated is managed by using the difference management bitmap 500 described above. In FIGS. 7A, 7B, and 7C, the block corresponding to ON is indicated by black inversion for convenience, instead of omitting the description of the difference management bitmap 500. FIG. 7A illustrates a state of an initial backup process. Comparing a state 710 of stored data in an initial logical volume with a state 711 of stored data in a logical volume at a time point of executing the backup process this time (first generation), it can be understood that blocks indicated by "A", "B", and "C" are newly written. Therefore, "A", "B", and "C" are extracted as a block data group 721. FIG. 7B illustrates a state of a second backup process (second generation). When stored data 712 in a logical volume at a time point of the current backup (second generation) is compared with the state 711 of the stored data in the logical volume at a time point of the previous backup (first generation), it can be understood that a block indicated by "A" has been updated. Therefore, the block "A'" is extracted as a block data group 722. FIG. 7C illustrates a state of a third backup process (third generation). When stored data 713 in a logical volume at a time point of the current backup (third generation) is compared with the stored data 712 in the logical volume at the time of the previous backup (second generation), it can be understood that blocks indicated by "B'" and "C'" have been updated. Therefore, the blocks "B'" and "C'" are extracted as a block data group 723.

As clear from the above description, since each generation is subjected to the backup process only by the update difference, it is necessary to superimpose backup data of the previous generation (parent generation) at the time of restoration. For example, in order to restore the logical volume to the state 712 in FIG. 7B, "ABC" needs to be restored by using the first-generation block data group 721, and then "A'" needs to be restored by using the second-generation block data group 722 ("A" is overwritten with "A'"). Therefore, it is necessary to pay attention to the fact that pieces of backup data of a plurality of generations may be handled in the restoration process to be described later. In order to improve the efficiency of the restoration process, only "BC" may be restored from the block data group 721, and "A'" may be restored from the block data group 722.

3-1-6. Internal Configuration of Backup Data Store (Second Storage Unit)

The backup data store 340 associated with the second storage unit 102 may be set to be in an object storage format. The backup data store in the object storage format can provide a broadband, as a transfer destination in the backup process or a transfer source in the restoration process. The internal configuration of the backup data store 340 will be described below.

Figure 8:
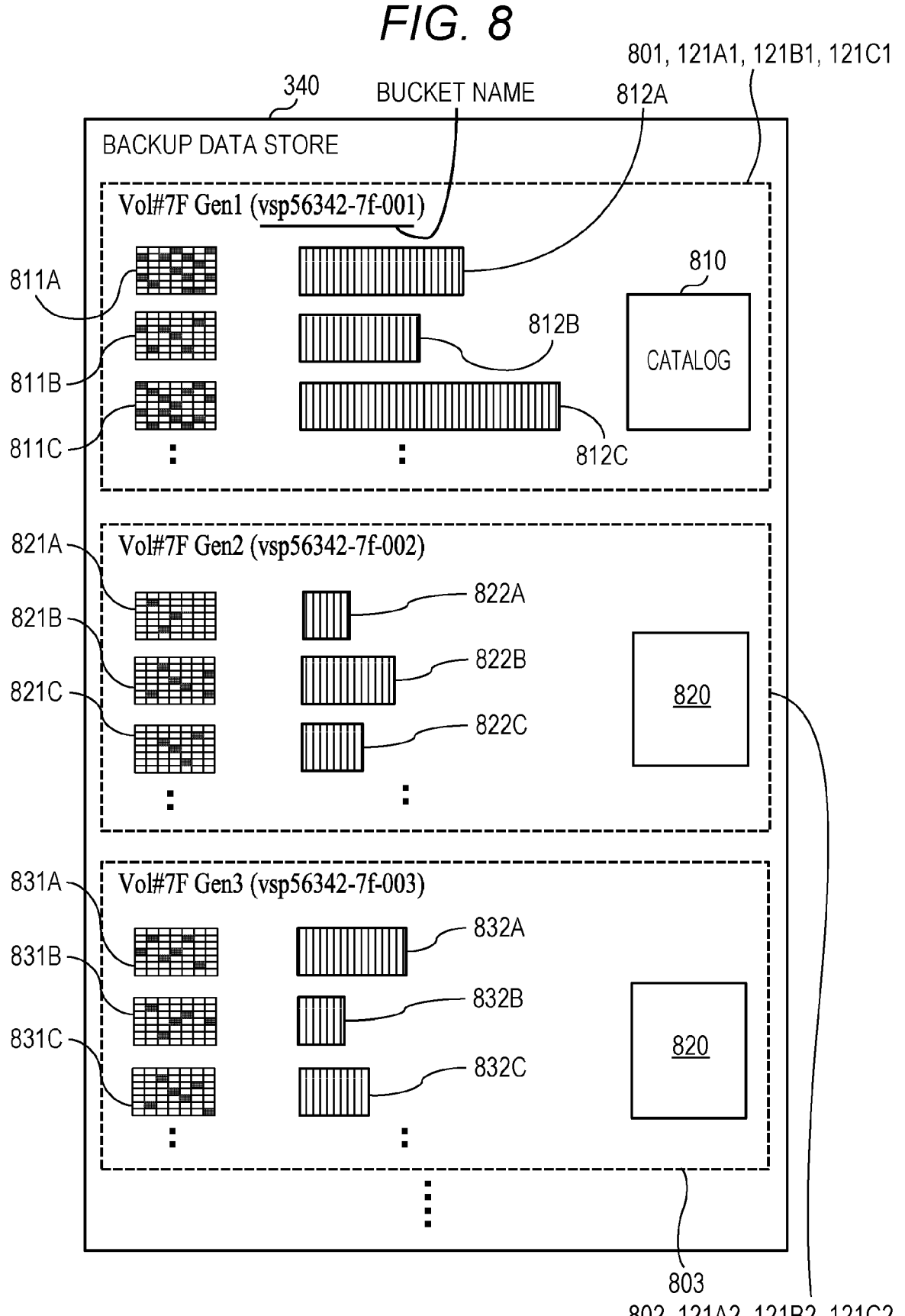
FIG. 8 illustrates a backup data store (second storage unit)

FIG. 8 illustrates a state in which backup data 121 is stored in the backup data store 340. The backup data store 340 in the present embodiment is, for example, a store in the object storage format on the public cloud side. For the backup data store 340, the presence or absence of an access authority may be set for each combination of an access request source and an access destination (for example, bucket) (in the backup data store 340).

In the example of FIG. 8, the backup data store 340 may include a bucket 801, a bucket 802, and a bucket 803 in the object storage format. Each of the buckets corresponds to each generation of the backup process. Although not illustrated, another bucket by a backup process of another logical volume may also be included in the backup data store 340. The bucket 801 stores first-generation backup data (Vol #7F Gen1) of the logical volume indicated by the logical volume number 7F, and is identified by a bucket name vsp56342-7f-001. The bucket 802 stores second-generation backup data (Vol #7F Gen2) of the logical volume indicated by the logical volume number 7F, and is identified by a bucket name vsp56342-7f-002. The bucket 803 stores third-generation backup data (Vol #7F Gen3) of the logical volume indicated by the logical volume number 7F, and is identified by a bucket name vsp56342-7f-003. The bucket 801 stores a difference management bitmap (second management information) 811, a block data group 812, and a backup catalog 810 as object files. Here, the difference management bitmap (second management information) 811 and the block data group 812 are divided for each of the management region 571 or 112 (A, B, C, . . . ) included in one logical volume. An object name with a serial number for each type is assigned to each object file, and the object file is stored so that the relevance can be determined. For example, "bitmap-7f-001.000", "bitmap-7f-001.001", and "bitmap-7f-001.002" are sequentially attached to the difference management bitmaps 811A, 811B, and 811C, and "block-7f-001.000", "block-7f-001.001", and "block-7f-001.002" are sequentially attached to the block data group 812A, 812B, and 813C. The difference management bitmaps (second management information) 811A, 811B, and 811C correspond to the difference management bitmap (first management information) 500 illustrated in FIG. 5, and are information indicating storage positions of difference data (write data, block data) in the logical volume. The block data groups 812A, 812B, and 812C correspond to the block data group 721 illustrated in FIG. 7A, and are a group of a plurality of pieces of block data extracted based on the difference management bitmaps 811A, 811B, and 811C (500A, 500B, and 500C). In the example of FIG. 8, each of the block data groups 812A, 812B, and 813C is illustrated as a single file, but may be divided into a plurality of object files according to the size. In the backup catalog 810, summary information of the backup process has been described. Details thereof will be described later with reference to FIG. 9. Similarly, the bucket 802 stores the difference management bitmaps 821A, 821B, and 821C, and the block data groups 822A, 822B, and 822C, and the backup catalog 820 as object files, respectively. The same is applied to the bucket 803, and thus description thereof will be omitted.

In the present embodiment, it is assumed that the information of the backup process is stored in different buckets for each generation, but the information on the backup process for a plurality of generations may be stored in one bucket. The object name of the object file stored in the bucket includes information regarding the generation. Therefore, there is no problem even if information of backup process for a plurality of generations is included in one bucket. Access to each object file of the backup data store 340 is performed using an object key including an object name, a bucket name, an account name, a URL address of the backup data store, and the like.

FIGS. 9A and 9B illustrate the information included in the backup catalog stored in each of the buckets of the backup data store 340. FIG. 9A illustrates an internal configuration of a first-generation backup catalog 810 included in the bucket 801 of FIG. 8. The backup catalog 810 has an object name of "catalog-7f-001-0.dat". The backup catalog 810 has, as information, a device product number 910 of a backup source, a volume number 911 of a transfer source in the backup process, a volume size 912, a volume name (nickname) 913, a backup generation number 914, a backup acquisition time point 915, a parent-generation catalog name 916, and a number of files 917 (in FIG. 9A, "the number of files of the difference management bitmap" is abbreviated as "the number of difference management bitmaps" or "the number of bitmaps") of the difference management bitmap. In the example of FIG. 9A, the device product number is "VSP56432", the transfer source volume number in the backup process is "0x7F", the volume size is "16.0 TB" (16.0 terabytes), the volume name (nickname) is "Volume B", the backup generation number is "01" (first generation), and the backup acquisition time point is "2021 Apr. 28 0:00". Since the generation is the first generation, there is no parent generation. Therefore, the catalog name of the parent generation is blank "-". The number of files of the difference management bitmap is "512". That is, one logical volume includes 512 management regions, which means that there are 512 object files of the difference management bitmap with the object names "bitmap-7f-001.000" to "bitmap-7f-001.511".

FIG. 9B illustrates a configuration of a second-generation backup catalog 820 included in the bucket 802 of FIG. 7. The backup catalog 820 has a configuration similar to that of the backup catalog 810. The backup catalog 820 has an object name of "catalog-7f-002-0.dat". In the example of FIG. 9B, the device product number is "VSP56432", the transfer source volume number in the backup process is "0x7F", the volume size is "16.0 TB", the volume name (nickname) is "Volume B", the backup generation number is "02" (second generation), and the backup acquisition time point is "2021 Apr. 28 3:00". The catalog name of the parent generation is an object name "catalog-7f-001-0.dat" under the bucket name "vsp56342-7f-001". This points to the backup catalog 810 (FIG. 9A). That is, when the restoration process of this generation is executed, the restoration process of the first-generation backup data indicated by the backup catalog 810 is required first. The number of files of the difference management bitmap is "512". Similar to FIG. 9A, one logical volume includes 512 management regions, which means that there are 512 object files of the difference management bitmap with the object names "bitmap-7f-002.000" to "bitmap-7f-002.511".

As described above, since the present disclosure includes the second management information (for example, the difference management bitmap) for each management region in the backed-up volume, the data as the target of the restoration process can be disposed at an appropriate position in the volume of the transfer destination in the restoration process.

The present disclosure can sufficiently utilize the broadband of the object store in the object storage format as described above.

3-1-7. Logical Configuration of Storage Volume Service (First Storage Unit)

Figure 10:
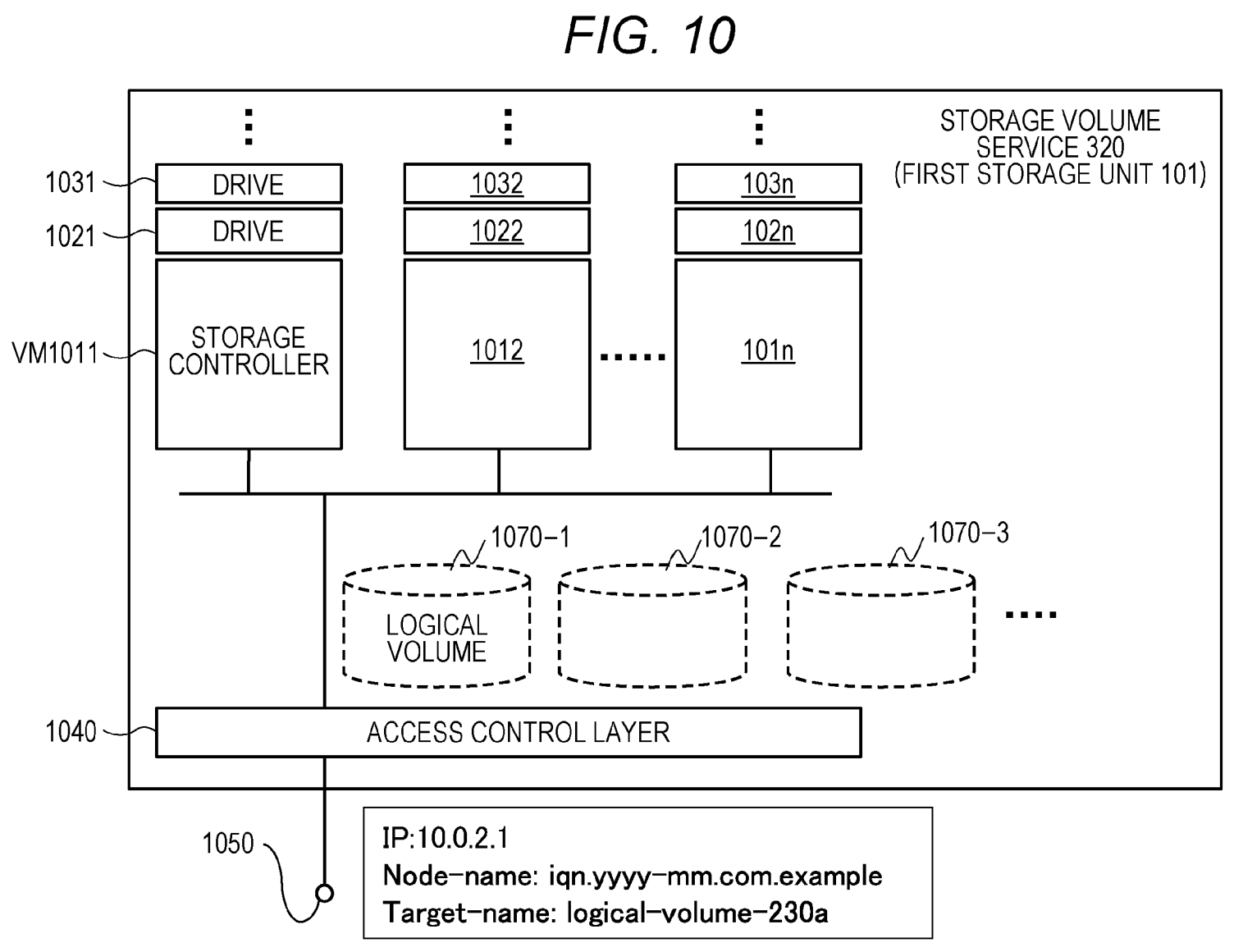

FIG. 10 illustrates a logical configuration of the storage volume service 320 associated with the first storage unit 101 in the first embodiment. The logical configuration illustrated in FIG. 10 is constructed by hardware resources (for example, hardware resources included in the architecture illustrated in FIG. 2. A physical drive which is a storage device or a recording medium for constructing a virtualized drive may also be included among the hardware resources) and software resources provided in the data center 302 on the cloud side. The storage volume service 320 includes a plurality of storage controller virtual computers 1011, 1012, . . . , and 101n ("virtual computer" is abbreviated as "VM" below. The same is applied to many portions of the drawings.), a plurality of virtualized drives 1021, 1022, . . . , 102n, 1031, 1032, . . . , and 103n (in FIG. 10, the "virtualized drive" is abbreviated as a "drive"), an access control layer 1040, a logical volume 1070 (1070-1, 1070-2, 1070-3, . . . ), and an access end-point 1050. The plurality of storage controller VMs 1011, 1012, . . . , and 101n operate to secure fault tolerance (for example, configure a RAID) by cooperating with each other using the plurality of virtualized drives 1021, 1022, . . . , and 102n, 1031, 1032, . . . , and 103n, and provides the logical volume 1070 (1070-1, 1070-2, 1070-3, . . . ). Similar to the on-premises storage device 310, the storage volume service 320 (for example, the storage controller VM) has a function of managing which LBA the data is written to, and includes the difference management bitmap 500 for each LBA region (the management region 571 or 112) as illustrated in FIG. 5, for example. The group of the logical volumes 1070 (1070-1, 1070-2, 1070-3, . . . ) is a storage volume group provided by the storage volume service 320. The storage operation management service 330 illustrated in FIG. 3 creates a logical volume 1070 with any volume size. In the example of FIG. 10, the logical volume 1070 (1070-1, 1070-2, 1070-3, . . . ) is an iSCSI block volume accessible via the IP network. The access control layer 1040 manages an access authority for the logical volume 1070. The access control layer 1040 operates to pass only an access to a permitted computer resource, by using a host group, an IP address (of an access request source), a port, a protocol, and the like in combination. The access end-point 1050 is an end point (end-point) for another computer resource to access the logical volume 1070 provided by the storage volume service 320. The example of FIG. 10 illustrates end-point information of the logical volume 1070-1. In the example of FIG. 10, in order to access the logical volume 1070-1, other computer resources are accessed by using "10.0.2.1" as an IP address (as an access destination), "iqn.yyyy-mm.com.example" as an iSCSI node name, and "logical-volume-230a" as an iSCSI target name.

In the above description, the logical volume 1070 is an isCSI volume provided by a plurality of storage controllers VM, but may be a standard storage volume service prepared by a cloud service vendor.

3-1-8. Computer Resources Constructed for Restoration Process

The cloud restoring system 350 according to the first embodiment of the present disclosure constructs (activates) computer resources 390 as the related resource group. The computer resources 390 execute the restoration process.

Figure 11:
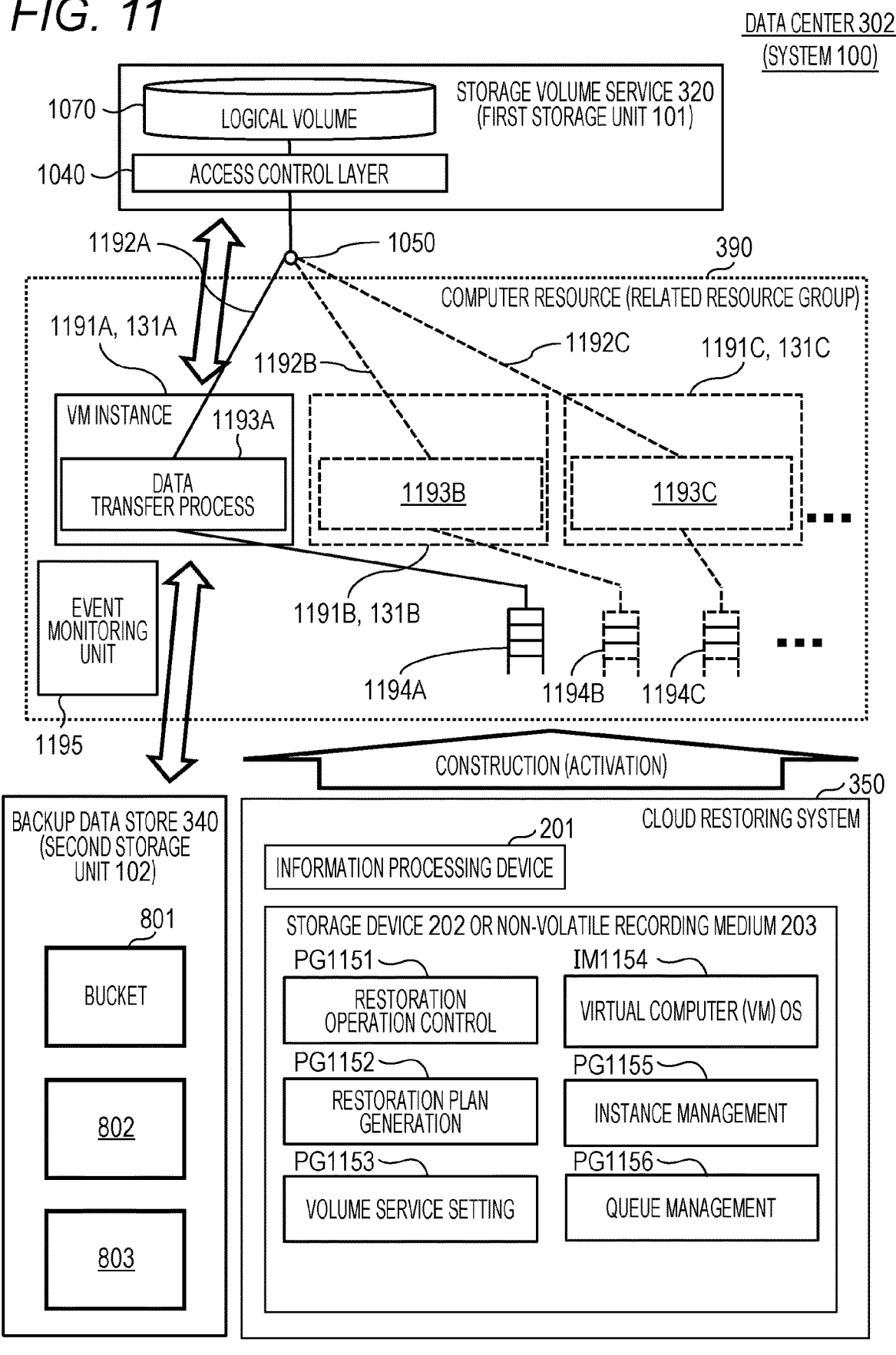
FIG. 11 illustrates computer resources constructed in the restoration process.

FIG. 11 is a diagram illustrating a relationship among the cloud restoring system 350, the computer resources 390 constructed (activated, generated) during processing of the cloud restoring system 350, the storage volume service 320 (the first storage unit 101), and the backup data store 340 (the second storage unit 102), in the first embodiment. As illustrated in FIG. 3, the cloud restoring system 350, the computer resources 390, the storage volume service 320, and the backup data store 34 are configured to be communicably connected to each other via the internal network 360 (not illustrated). A plurality of computer resources in the computer resources 390 illustrated in FIG. 11 may be associated with one hardware resource for realizing the computer resources 390.

The cloud restoring system 350 includes the information processing device 201 as illustrated in FIG. 2 and also includes the storage device 202 or the non-volatile recording medium 203. The storage device 202 or the non-volatile recording medium 203 stores a restoration operation control program 1151 (in the drawings, the "program" is abbreviated as "PG"), a restoration plan generation program 1152, a volume service setting program 1153, a virtual computer (VM) OS image 1154 (in the drawings, the "image" is abbreviated as "IM"), an instance management program 1155, and a queue management program 1156. The information processing device 201 executes the programs or images, thereby realizing the process executed by the cloud restoring system 350. The restoration operation control program 1151 is a main program for an instruction of the overall processing until completion of the restoration process when receiving a restoration instruction from the terminal 380. The restoration plan generation program 1152 is a program for determining whether or not restoration of another generation (parent generation) is required when restoring a target generation, and constructing an execution procedure. The volume service setting program 1153 is a program for acquiring information of the logical volume 1070 and the access control layer 1040 included in the storage volume service 320 and performing setting so that a VM instance 1191 can access the logical volume 1070. The VM instance 1191 will be described later. The VM OS image 1154 is a file storing an OS for operating the VM instance 1191 and a program operating thereon. The instance management program 1155 is a program for controlling start and end of the VM instance 1191. The queue management program 1156 is a program for controlling the setting of a queue service 1194 and an event monitoring unit 1195. The computer resources 390, which are the related resource group, may include the queue service 1194 (1194A, 1194B, and 1194C), the VM instance 1191 (1191A, 1191B, and 1191C), and the event monitoring unit 1195 which are dynamically created by execution of each program or image of the cloud restoring system 350. The queue service 1194 (1194A, 1194B, and 1194C) is a computer resource used to queue an instruction from the cloud restoring system 350 to the VM instance 1191. Each queue service 1194 has identification information for receiving an operation from another computer resource. The VM instance 1191 is a server computer resource executed by using the VM OS image 1154. Each VM instance 1191 is transferred with identification information of the queue service 1194 in charge at the time of activation as an argument. After the activation of the OS of the VM, the VM instance 1191 executes a program included in the VM OS image 1154 to construct (activate) a data transfer process 1193 (1193A, 1193B, and 1193C). The data transfer process 1193 monitors, for example, the presence or absence of a restoration process request in the queue service 1194 in charge based on the identification information transferred as the argument. The event monitoring unit 1195 monitors, for example, a queue length in response to the restoration process request accumulated in the queue service 1194. In a case where the queue length exceeds/falls below a specified threshold value, the event monitoring unit 1195 notifies the cloud restoring system 350. The cloud restoring system 350 is illustrated independently in the present embodiment, but may be configured as a part of the storage operation management service 330.

3-1-9. Restoration Setting Screen

The restoration process can be set in a manner that the user or the like operates a restoration setting screen displayed on the terminal 380. An example in which a transfer destination of the restoration process is the logical volume 1070 in the storage volume service 320 (the first storage unit 101) will be described below. As clear from the restoration setting screen to be described later, the transfer destination of the restoration process may be set to the logical volume 470 in the on-premises storage device 310.

Figure 12:
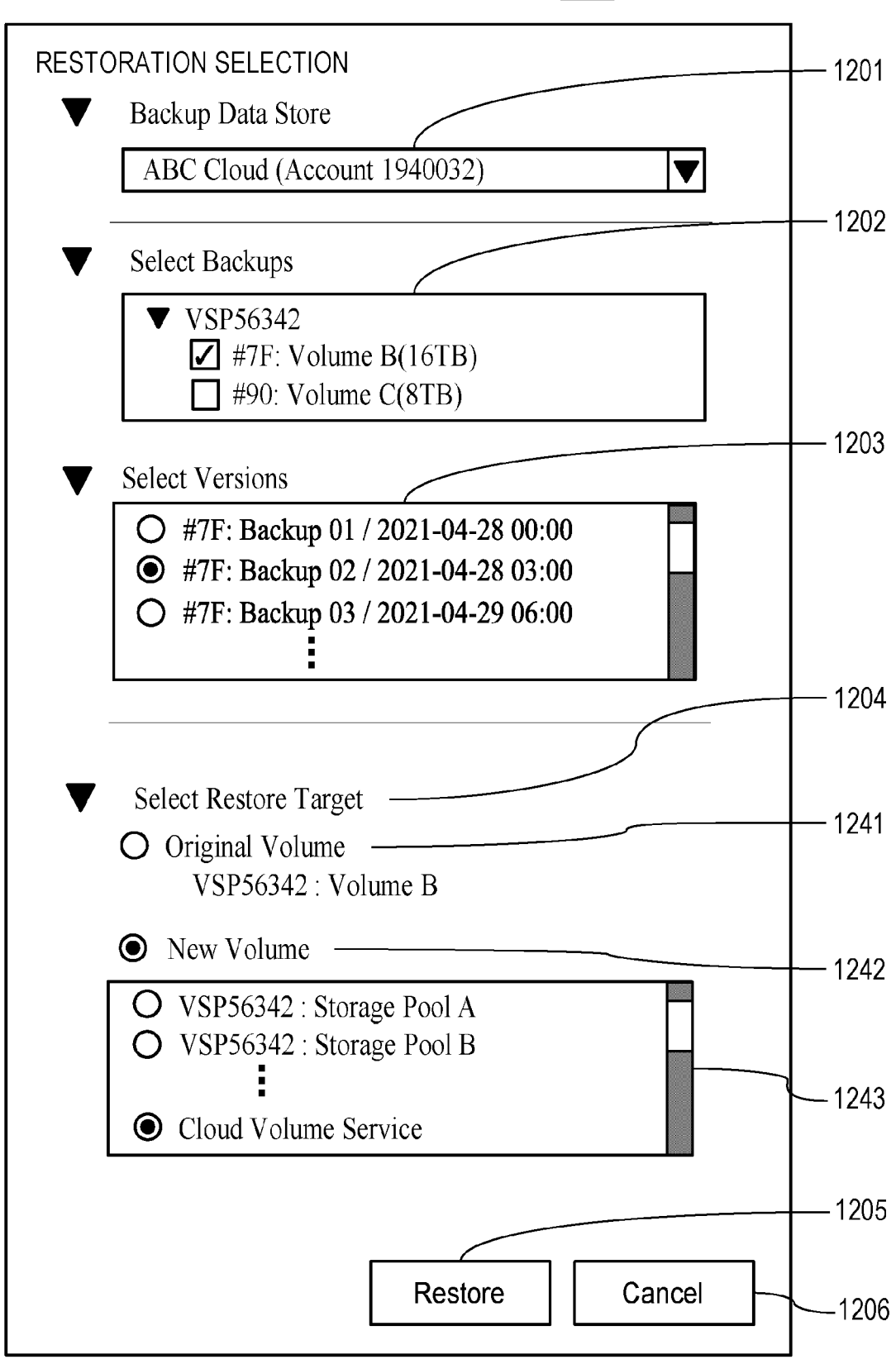
FIG. 12 illustrates a restoration setting screen.

FIG. 12 illustrates a restoration setting screen 1200. The restoration setting screen 1200 is operated through the terminal 380. As a result, the storage operation management service 330 instructs the cloud restoring system 350 (or the on-premises storage device 310) to execute the restoration process. Information to be displayed on the restoration setting screen 1200 may be prepared mainly by the terminal 380, may be prepared mainly by a device other than the terminal 380 (for example, the data center 301 or the storage operation management service 330 in the data center 302), or may be prepared in cooperation by a plurality of devices.

The restoration setting screen 1200 includes a backup data store selection region 1201, a volume selection region 1202, a backup generation selection region 1203, a restoration destination selection region 1204, a restoration execution button 1205, and a cancel button 1206. The backup data store selection region 1201 includes, for example, a drop-down box (pull-down menu), and is provided for selecting the backup data store 340 as the transfer destination of the restoration process. In the example of FIG. 12, "ABC Cloud (Account 1940032)" is selected (together with the account name). The volume selection region 1202 is provided for selecting a logical volume with which backup data as a transfer target in the restoration process is associated before the backup process. In the example of FIG. 12, a logical volume (logical volume on which the backup process has been executed) that is indicated by a logical volume number "7F" and a logical volume name (nickname) "Volume B" (16 terabytes (16 TB)) and is included in a device having a device number of "VSP56342" is selected as a target. The backup generation selection region 1203 is provided for selecting the generation in which the state of a logical volume is restored at a backup acquisition time point (the range of the generation group in which backup data is restored) for the logical volume selected in the volume selection region 1202. In the example of FIG. 12, "Backup02" (second generation) acquired at "Apr. 28, 2021 3:00" is selected. In the case of this selection, the backup data of the first generation and the second generation is restored to the logical volume by the restoration process. The restoration destination selection region 1204 is provided for selecting the transfer destination in the restoration process. An original logical volume selection 1241 and a new logical volume selection 1242 are shown in the restoration destination selection region 1204. The original logical volume selection 1241 is an option to set the original logical volume (Original Volume) selected in the volume selection region 1202 as the transfer destination in the restoration process. The new logical volume selection 1242 is an option to select a new logical volume (New Volume) as the transfer destination in the restoration process. When the user or the like selects the new logical volume selection 1242, the volume selection region 1243 for selecting which storage system is used to create the logical volume is used. In the example of FIG. 12, it is selected to set the new logical volume as the transfer destination in the restoration process, and it is selected to cause the cloud volume service to create a new logical volume that stores the transfer data in the restoration process (for example, a new logical volume 1070 is created in the storage volume service 320 in the data center 302 and used as the transfer destination in the restoration process). The restoration execution button 1205 is a button selected at the time of execution based on the contents set on the restoration setting screen 1200. When the restoration execution button 1205 is selected, the setting contents are transmitted to the storage operation management service 330 (or the on-premises storage device 310), and the restoration process is started. The cancel button 1206 is a button selected when the contents set on the restoration setting screen 1200 are discarded and canceled. In a case where the transfer destination in the restoration process is the on-premises storage device 310, the processing entity of the restoration process may be any of the device management subsystem 460, the I/O control subsystem 450, and the backup/restoration interface 410.

3-2. Processing of First Embodiment (Restoration Process) of Present Disclosure

Based on the system configuration of the first embodiment described above, a series of processes executed for the restoration process from the backup data store 340 associated with the second storage unit 102 to the logical volume 1070 in the storage volume service 320 associated with the first storage unit 101 will be described below.

3-2-1. Until Instructing Cloud Restoring System to Execute Restoration Process

First, a procedure until the storage operation management service 330 that has received the setting contents of the restoration process input by the user or the like using the restoration setting screen 1200 instructs the cloud restoring system 350 to execute the restoration process will be described below.

Figure 13:
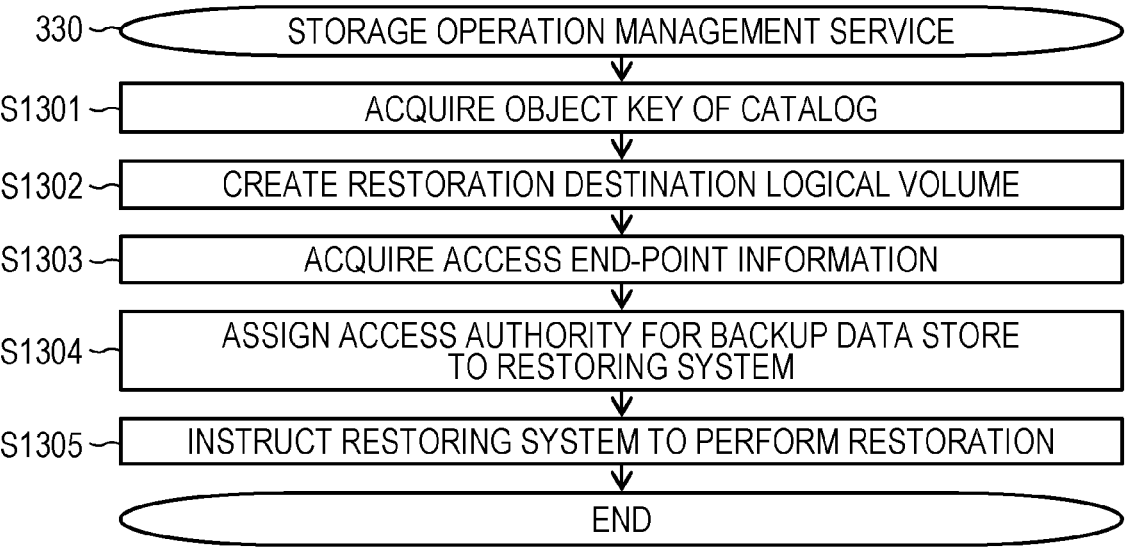
FIG. 13 illustrates processing until a restoration instruction is given to a restoring system.

FIG. 13 is a flowchart illustrating processing until the storage operation management service 330 instructs the cloud restoring system 350 to execute the restoration process when the storage volume service 320 on the cloud side is selected as the transfer destination in the restoration process by using the restoration setting screen 1200 of FIG. 12.

In Step 1301, when the information designated on the restoration setting screen 1200 is received, the storage operation management service 330 searches the summary information received when the backup process is completed, and acquires an object key of a backup catalog corresponding to the backup data to be restored. Then, in Step 1302, the storage operation management service 330 accesses the storage volume service 320 and creates the logical volume 1070 as the transfer destination in the restoration process. In Step 1303, the storage operation management service 330 acquires information of the access end-point 1050 necessary for accessing the logical volume 1070. Thereafter, in Step 1304, the storage operation management service 330 gives, to the cloud restoring system 350, an access authority for the backup data store 340 (indicated by "ABC Cloud (Account 1940032)" in the example of FIG. 12), which is the transfer source in the restoration process. Finally, in Step 1305, the storage operation management service 330 instructs the cloud restoring system 350 to execute the restoration process by using the object key of the backup catalog, which has been previously acquired, and the information of the access end-point 1050 of the logical volume 1070.

3-2-2. Processing of Cloud Restoring System Instructed to Execute Restoration Process The cloud restoring system 350 instructed to execute the restoration process from the storage operation management service 330 determines the number of temporary computer resources (for example, VM instances 1191) to be constructed (activated) for the restoration process, and constructs (activates) the determined number of temporary computer resources (VM instances 1191). The cloud restoring system 350 mounts one common logical volume 1070 as the transfer destination in the restoration process on each of the activated temporary computer resources (VM instances 1191). The cloud restoring system 350 allocates the backup data for each combination of the generation and the management region with respect to the backup data as the target of the restoration process, to each of the activated temporary computer resources (VM instances 1191). The above processing will be described in order below.

FIG. 14 illustrates a flowchart of processing performed by the cloud restoring system 350 when being instructed to execute the restoration process from the storage operation management service 330.

First, in Step 1401, the cloud restoring system 350 acquires the backup catalog from the backup data store 340 by using the object key received at the time of the instruction. In Step 1402, the cloud restoring system 350 executes the restoration plan generation program 1152, checks the parent-child relationship of the backup data, and creates a list (restoration plan) of the backup data to be subjected to the restoration process.

3-2-2-1. Creation of Restoration Plan

Figure 15:
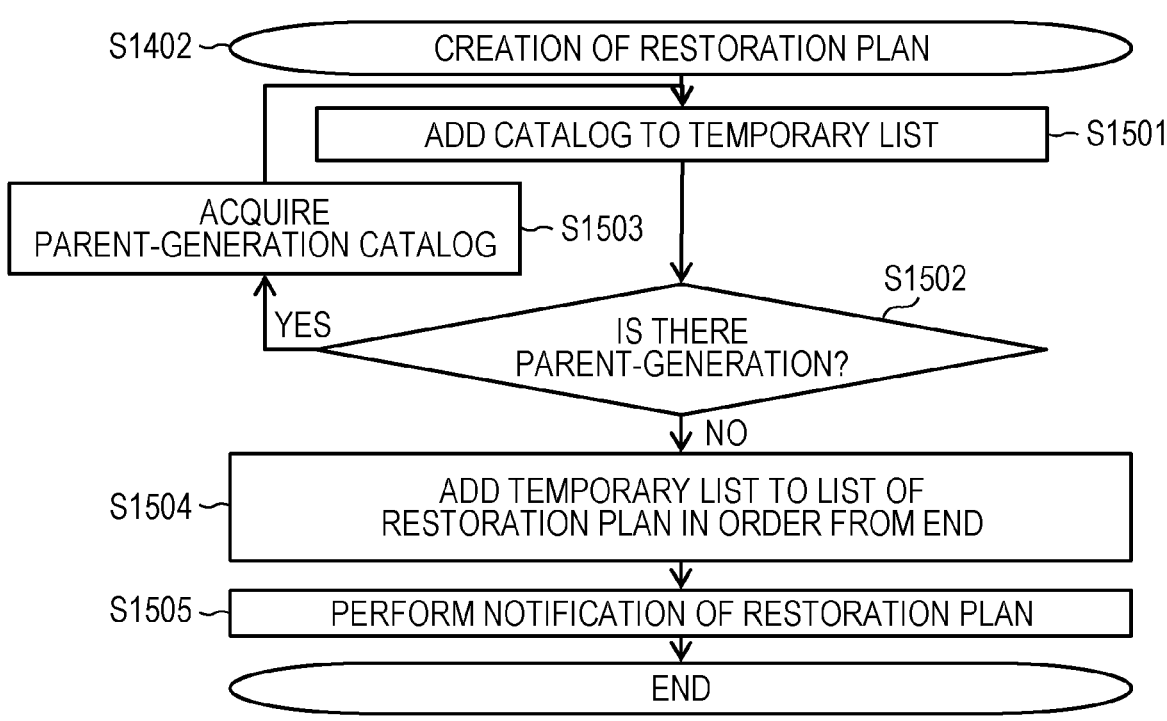
FIG. 15 illustrates processing for constructing a restoration plan.

FIG. 15 illustrates a state in which the cloud restoring system 350 executes the restoration plan generation program 1152 to construct a restoration plan (order list of backup catalog groups being targets for the restoration process).

In Step 1501, when acquiring the backup catalog of the backup data being the target for the restoration process, the cloud restoring system 350 that executes the restoration plan generation program 1152 adds the acquired backup catalog to the top of the temporary list. In Step 1502, the cloud restoring system 350 that executes the restoration plan generation program 1152 analyzes the backup catalog and checks whether or not there is a backup catalog of the parent generation. In a case where there is the backup catalog of the parent generation (Yes in Step 1502), that is, in a case where there is backup data of a difference of the previous generation necessary for the restoration process, the cloud restoring system 350 that executes the restoration plan generation program 1152 acquires the backup catalog of the parent generation from the backup data store 340 in Step 1503. In Step 1501 again, the backup catalog of the parent generation is sequentially added to the temporary list. Thereafter, the processes are repeated recursively in the similar manner. On the other hand, in a case where there is no more backup catalog of the parent generation in the acquired backup catalog (No in Step 1502), the cloud restoring system 350 that executes the restoration plan generation program 1152 adds the backup catalog stored in the temporary list to the list of the restoration plan in the reverse order (LIFO) from the end of the temporary list in Step 1504. That is, the restoration plan is configured to be arranged in order from the oldest generation in which the restoration process is to be executed. For example, in a case where the restoration process is executed to be in the state at the time point of the second-generation backup process, the restoration plan includes the first-generation backup catalog 810 and the second-generation backup catalog 820 in this order. In Step 1505, the cloud restoring system 350 that executes the restoration plan generation program 1152 notifies the cloud restoring system 350 of the restoration plan.

The description of FIG. 15 is ended here, and the description returns to FIG. 14.

3-2-2-2. Determination of Number of Computer Resources to be Constructed (Activated) for Restoration Process After Step 1402 of FIG. 14, in Step 1404, the setting change unit 135 constructed by the cloud restoring system 350 checks whether the logical volume 1070 as the transfer destination in the restoration process is multi-attachable. In a case where the logical volume 1070 is multi-attachable (Yes in Step 1404), in Step 1405, the setting change unit 135 enables multi-attach for the logical volume 1070 as the transfer destination in the restoration process. The setting of multi-attach enabling may be performed, for example, by enabling a multi-attach permission or changing to a multi-attachable disk type. A case where the logical volume 1070 cannot be multi-attachable (No in Step 1404) may include a case where the logical volume 1070 cannot be changed to multi-attach due to a specification constraint or a contract constraint of the user or the like.

Thereafter, in Step 1406, the computer resource number determination unit 132 constructed by the cloud restoring system 350 checks the number of connectable hosts, which is the number of computer resources (for example, temporary computer resources, VM instances) on which one logical volume 1070 as the transfer destination in the restoration process can be mounted. Various factors may be assumed to determine the number of connectable hosts. The number of connectable hosts may be based on, for example, any of a design specification of the storage volume service 320, a design specification of the entirety of the data center 302, or a contract constraint such as a user who uses a service provided by the data center 302.

Next, in Step 1407, the computer resource number determination unit 132 compares the number of connectable hosts checked in Step 1406 with the number of files of the difference management bitmap described in the backup catalog as the target of the restoration process. Here, the number of files of the difference management bitmap is the number of difference management bitmaps corresponding to backup data of one generation among pieces of the backup data as the target of the restoration process. That is, the number of files of the difference management bitmap is the number of management regions 571 (112) included in one logical volume of the transfer source in the backup process when the backup process has been executed in the past on the backup data being the target of the restoration process.

In a case where the number of files of the difference management bitmap is more than the number of connectable hosts (Yes in Step 1407), in Step 1409, the computer resource number determination unit 132 sets the number of computer resources to be constructed (activated) for the subsequent restoration process to be the same as the number of connectable hosts checked in Step 1406. On the other hand, in a case where the number of files of the difference management bitmap is equal to or less than the number of connectable hosts (No in Step 1407), the computer resource number determination unit 132 sets the number of computer resources to be constructed (activated) for the restoration process to be the same as the number of files of the difference management bitmap. In a case where the logical volume 1070 as the transfer destination of the restoration process is not multi-attachable (No in Step 1404), the computer resource number determination unit 132 sets the number of computer resources to be constructed (activated) for the restoration process to 1 in Step 1408. Although not illustrated, in a case where the number of computer resources that may be set in either Step 1409 or Step 1410 in accordance with the above-described aspect is in conflict with the specification on the cloud system (for example, the design specification of the storage volume service 320, the design specification of the entire data center 302, or the contract restriction of the user or the like who uses the service provided by the data center 302), the computer resource number determination unit 132 determines the number of computer resources again within a range without conflict. Some or all of Steps 1406, 1407, 1408, 1409, and 1410 may constitute a computer resource number determination step.

As described above, in the present disclosure, the number of computer resources to be constructed (activated) can be appropriately determined in consideration of both the maximum number of hosts related to the volume and the number of management regions included in the volume. Here, in the present disclosure, the number of management regions included in the volume is determined by the number of pieces of second management information (for example, the difference management bitmap) associated with the management regions. Thus, the number of management regions included in the volume can be appropriately determined.

3-2-2-3. Construction (Activation) of Computer Resource and Mounting (Multi-Attach) Setting After determining the number of computer resources to be constructed (activated) for the restoration process, in Step 1411, the computer resource activation unit 133 constructed by the cloud restoring system 350 creates queue services 1194 of a number corresponding to the number of computer resources to be constructed (activated). In Step 1412, the computer resource activation unit 133 constructs (activates) the VM instances 1191 of a number corresponding to the number of computer resources by using identification information of each queue service 1194 and the VM OS image 1154, and associates the VM instance 1191 with the queue service 1194. Thereafter, in Step 1413, the computer resource activation unit 133 executes the volume service setting program 1153 to set an access authority in the access control layer 1040 so that each VM instance 1191 can access one common logical volume 1070 as the transfer destination in the restoration process. The computer resource activation unit 133 executes a process for giving an access authority for the backup data store 340 to the VM instance 1191. In Step 1414, the computer resource activation unit 133 executes the instance management program 1155, thereby setting the connection path 1192 to the access end-point 1050 corresponding to the logical volume 1070 as the transfer destination in the restoration process (by setting the connection path 1192, an access from the VM instance 1191 to the logical volume 1070 becomes possible), and mounting one common logical volume 1070 as the transfer destination in the restoration process on each VM instance 1191. Thereafter, in Step 1415, the computer resource activation unit 133 sets the event monitoring unit 1195 that monitors the queue length. Some or all of Steps 1411, 1412, 1413, 1414, and 1415 may constitute a computer resource activation step.

3-2-2-4. Allocation of Process to Each Computer Resource

After the cloud restoring system 350 constructs (activates) the computer resources 390, in Step 1416, the region allocation unit 134 constructed by the cloud restoring system 350 acquires the backup catalog to be processed first, with reference to the restoration plan created by the processes of Step 1402 and FIG. 15. In Step 1417, the region allocation unit 134 acquires information (917 in FIGS. 9A and 9B) of the number of files of the difference management bitmap from the backup catalog, and generates an object name of an object file (any of 811, 821, and 831 in FIG. 8) of the difference management bitmap and an object name (any of 812, 822, and 832 in FIG. 8) of the block data group. For example, in a case where the volume number of the logical volume which is the transfer source in the past backup process is 7f, the generation of the backup process is the first generation, and the number of files of the difference management bitmap is 512, the region allocation unit 134 generates "bitmap-7f-001.000" to "bitmap-7f-001.511" that are object names of the difference management bitmap for each management region, and "block-7f-001.000" to "block-7f-001.511" that are object names of the block data group for each management region. Here, the part "001" corresponds to the backup generation number 914, and the parts "000" to "511" correspond to the numbers of the management regions 571 (112). The region allocation unit 134 configures an object key from the object name, the storage destination bucket name, the account name, the URL address of the access destination backup data store, and the like. In Step 1418, the region allocation unit 134 pairs the object key of the difference management bitmap with the object key of the corresponding block data group, and sequentially queues the object keys as a processing target to the queue service 1194 (1194A, 1194B, 1194C, . . . ). In a case where all the remaining pairs of object keys are not queued even though the pairs of object keys are queued one by one in all the queue services 1194 (No in Step 1419) (for example, in a case where the number of queue services 1194 is 3 while there are 512 pairs of object keys (there are 512 management regions in one logical volume)), the process returns to Step 1418. The region allocation unit 134 repeats the processes to queue the remaining pairs of object keys. In a case where all the remaining pairs of object keys are queued by queuing the pairs of object keys one by one in all the queue services 1194 (Yes in Step 1419), in Step 1420, the region allocation unit 134 checks whether there is a backup catalog to be processed next, with reference to the restoration plan. In a case where there is the backup catalog to be processed next (Yes in Step 1420), in Step 1421, the region allocation unit 134 resets a start point so that the destination to queue the pair of object keys is the first queue service 1194A. The process returns to Step 1416, and the region allocation unit 134 acquires the backup catalog to be processed next and repeats the processes. The reason why the start point is reset in Step 1421 is that the same VM instance 1191 processes the restoration processes of different generations related to the same LBA management region, thereby guaranteeing the correct order of the restoration processes of different generations related to the same management region, and preventing an occurrence of the generation difference of the restoration process. In a case where the queuing process corresponding to all the backup catalogs included in the restoration plan has been completed (No in Step 1420), the region allocation unit 134 completes the queuing process of the pair of object keys for the restoration process. Some or all of Steps 1416, 1417, 1418, 1419, 1420, and 1421 may construct a region allocation step.

Figure 16:
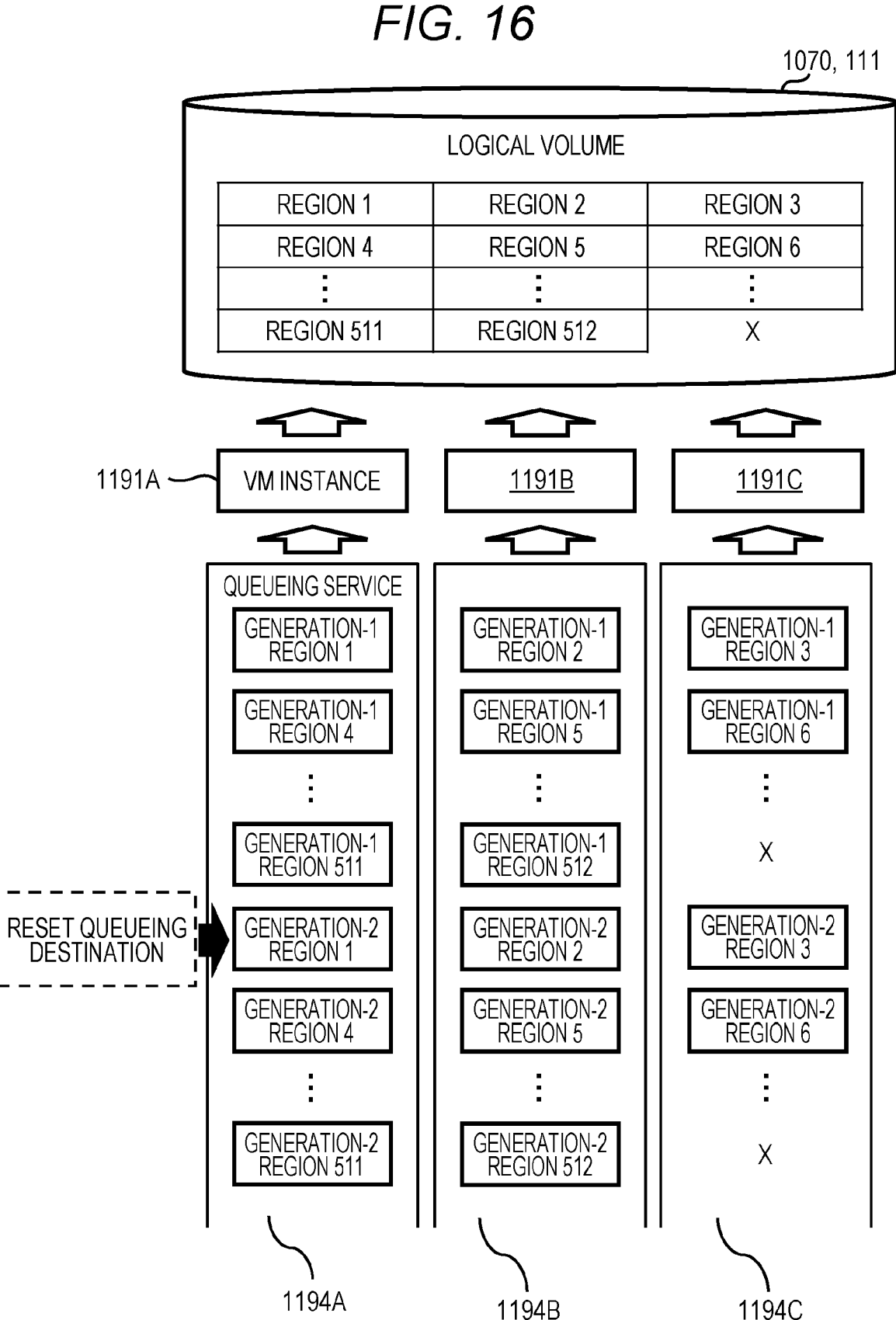
FIG. 16 illustrates allocation (queuing) of a process to a computer resource at the time of restoration.

3-2-2-5. Allocation of Process to Computer Resource in Restoration Process Including Plurality of Generations FIG. 16 is a diagram for describing Step 1421 in FIG. 14 in detail, and illustrates an example of allocation of the process to the computer resource (VM instance 1191) in the restoration process including a plurality of generations. In the example of FIG. 16, the restoration process is executed from the backup data store 340 to one logical volume 1070 of the storage volume service 320. The logical volume 1070 (volume 111) of the transfer destination of the restoration process includes 512 pieces of management regions 571 (112). In FIG. 16, the 512 pieces of management regions 571 (112) are described as "Region 1" to "Region 512". The example of FIG. 16 intends to restore the state at the time point of the second-generation backup process. In a case where the difference backup process is executed for each generation, in the restoration process, for each of the management regions 571 (112), it is necessary to reflect the first-generation backup data (if there is the first-generation backup data) in the logical volume 1070 and then reflect the second-generation backup data (if there is the second-generation backup data) in the logical volume 1070. In the example of FIG. 16, three VM instances 1191 are constructed (activated) to execute the restoration process. That is, FIG. 16 illustrates a case where it is determined in Step 1407 of FIG. 14 that 512 that is the number of difference management bitmaps is more than 3 that is the number of connectable hosts, and thus it is determined in Step 1409 that the number of computer resources (VM instances 1191) to be constructed (activated) is 3 that is the number of connectable hosts. In the example of FIG. 16, for example, a box described as "Generation 1 Region 1" indicates a pair of object keys corresponding to the first generation and the first management region 571A (112A) (pair of an object key of the difference management bitmap 811A and an object key of the block data group 812A). The VM instance 1191 that has received the pair of object keys allocates the part of the restoration process corresponding to the combination of the generation and the management region corresponding to the pair of object keys.

In the example of FIG. 16, a pair of object keys of "Generation 1 Region 1" is queued in the queue service 1194A and allocated to the VM instance 1191A. Pairs of object keys corresponding to the respective management regions of the first generation are sequentially allocated to the three VM instances 1191. Cyclic allocation may be performed as in the example of FIG. 16. In a case where cyclic allocation is performed, a pair of object keys of the "Generation 1 Region 512" is allocated to the VM instance 1191B. The region allocation unit 134 then allocates the pair of object keys of "Generation 2 Region 1". In this case, the region allocation unit 134 allocates the pair of object keys of "Generation 2 Region 1" to the VM instance 1191A to which the pair of object keys of "Generation 1 Region 1" is allocated, instead of the VM instance 1191C which is the next position in the cyclic allocation. That is, even in a case where cyclic allocation is performed, the region allocation unit 134 temporarily resets a pointer indicating an allocation destination of the pair of object keys (queuing destination in the queue service 1194) in switching of the generation of the target for which the allocation process is executed. In this manner, pairs of object keys of different generations in the same management region 571 (112) are allocated to the same VM instance 1191. The present disclosure is not limited to the cyclic allocation, and it is sufficient that the restoration process is executed in a correct order for backup data of different generations in the same management region 571 (112). In a case where parts of the restoration process of a plurality of generations related to the same management region 571 (112) are allocated, the VM instance 1191 executes each part of the restoration process in order of a normal processing result.

As described above, in the present disclosure, in a case where the backup data of the plurality of generations is to be sequentially set to the target of the restoration process, the restoration process can be normally executed.

The region allocation unit 134 may queue the pair of object keys related to the combination in the queue service 1194 only in a case where the difference management bitmaps 811, 821, and 831 (second management information) corresponding to the combination of the generation and the management region 571 (112) indicate that at least one piece of data in the management region 571 (112) is backed up in the backup data store 340 (second storage unit 102). Since the region allocation unit 134 controls queuing in this manner, only for a combination of the generation in which there is data to be restored and the management region 571 (112), the restoration process related to the combination can be allocated to the VM instance 1191 (computer resource 131), and the efficiency of the restoration process can be improved.

3-2-2-6. Process Executed by VM Instance in Restoration Process

The VM instance 1191 executes the part of the restoration process corresponding to the combination of the generation and the management region 571 (112) corresponding to the pair of object keys received from the corresponding queue service 1194.

Figure 17:
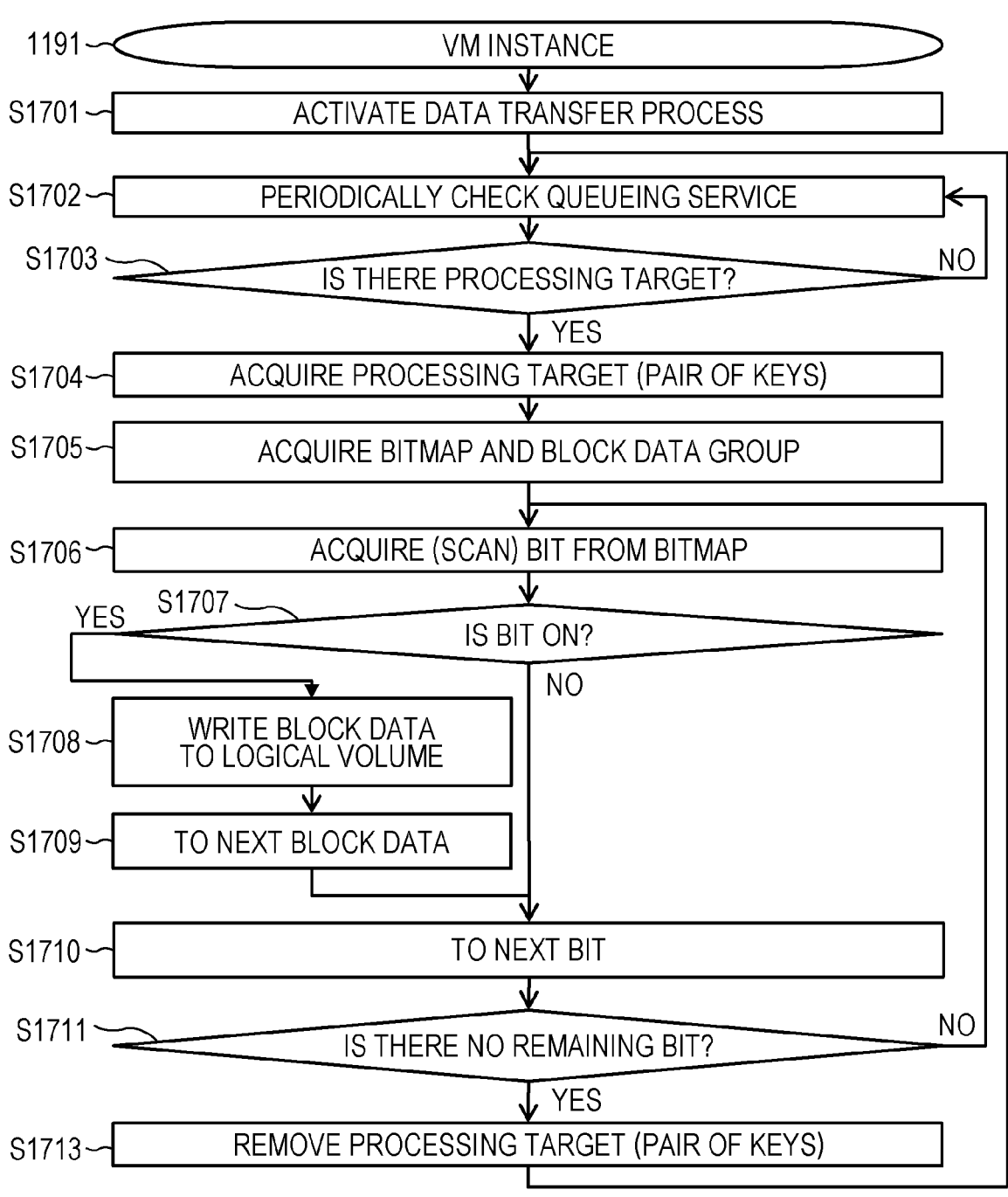
FIG. 17 illustrates processing performed by a virtual computer instance at the time of restoration.

FIG. 17 illustrates a flowchart of processing of the VM instance 1191 during the restoration process.

In Step 1701, the VM instance 1191 activates the data transfer process 1193 corresponding to the program included in the VM OS image 1154 by reading and activating the VM OS image 1154. The VM instance 1191 is set to be accessible to the backup data store 340 and the logical volume 1070 by Steps 1413 and 1414 in FIG. 14. In Step 1702, the data transfer process 1193 that operates on the VM instance 1191 periodically checks the queue service 1194 corresponding to the queue service identification information transferred as the argument at the time of activation. In a case where there is a pair (processing target) of object keys in the queue service 1194 (Yes in Step 1703), the data transfer process 1193 acquires the pair of object keys from the queue service 1194 in Step 1704. In Step 1705, the data transfer process 1193 acquires an object file of the block data group corresponding to the difference management bitmap, from the backup data store 340 based on the acquired pair of object keys. Then, in Step 1706, the data transfer process 1193 sequentially scans bits of the difference management bitmap in order to determine which LBA of the logical volume 1070 is required to be written. In a case where the bit is ON (Yes in Step 1707), this means that there is data to be restored in the LBA corresponding to the bit. Thus, in Step 1708, the data transfer process 1193 acquires the first block data from the block data group and writes the first block data in the logical volume 1070. In Step 1709, the data transfer process 1193 moves a reference destination to the next block data. Then, in Step 1710, the data transfer process 1193 advances the value of a reference destination LBA of the logical volume 1070 and the position of a reference destination bit of the difference management bitmap by one. On the other hand, in a case where the bit of the difference management bitmap acquired (scanned) in Step 1706 is OFF (No in Step 1707), this means that there is no data to be restored to the LBA corresponding to the bit. Thus, in Step 1710, the data transfer process 1193 advances the value of the reference destination LBA of the logical volume 1070 and the position of the reference destination bit of the difference management bitmap by one without doing anything. In Step 1711, the data transfer process 1193 determines whether or not all the bits of the difference management bitmap have been referred to (acquired, scanned). In a case where there are still remaining bits (No in Step 1711), the data transfer process 1193 repeats the processes of Steps 1706 to 1710. On the other hand, in a case where all the bits have been referred to (acquired, scanned) (Yes in Step 1711), since the process corresponding to the pair of object keys (processing target) targeted in the series of steps from Step 1704 to Step 1711 has been completed, the data transfer process 1193 removes (dequeues) the pair of object keys (processing target) from the queue service 1194 in Step 1713. After Step 1713, the data transfer process 1193 returns control to Step 1702 to return to the process of periodically checking whether or not there is an unprocessed pair of object keys in the queue service 1194.

3-2-2-7. Resource Release of VM Instance in Restoration Process

In a case where there are a plurality of VM instances 1191 constructed (activated) for executing the restoration process, the cloud restoring system 350 and the computer resources 390 can be sequentially released from the VM instances 1191 for which the allocated process is completed without waiting for completion of the entirety of the restoration process.

Figure 18:
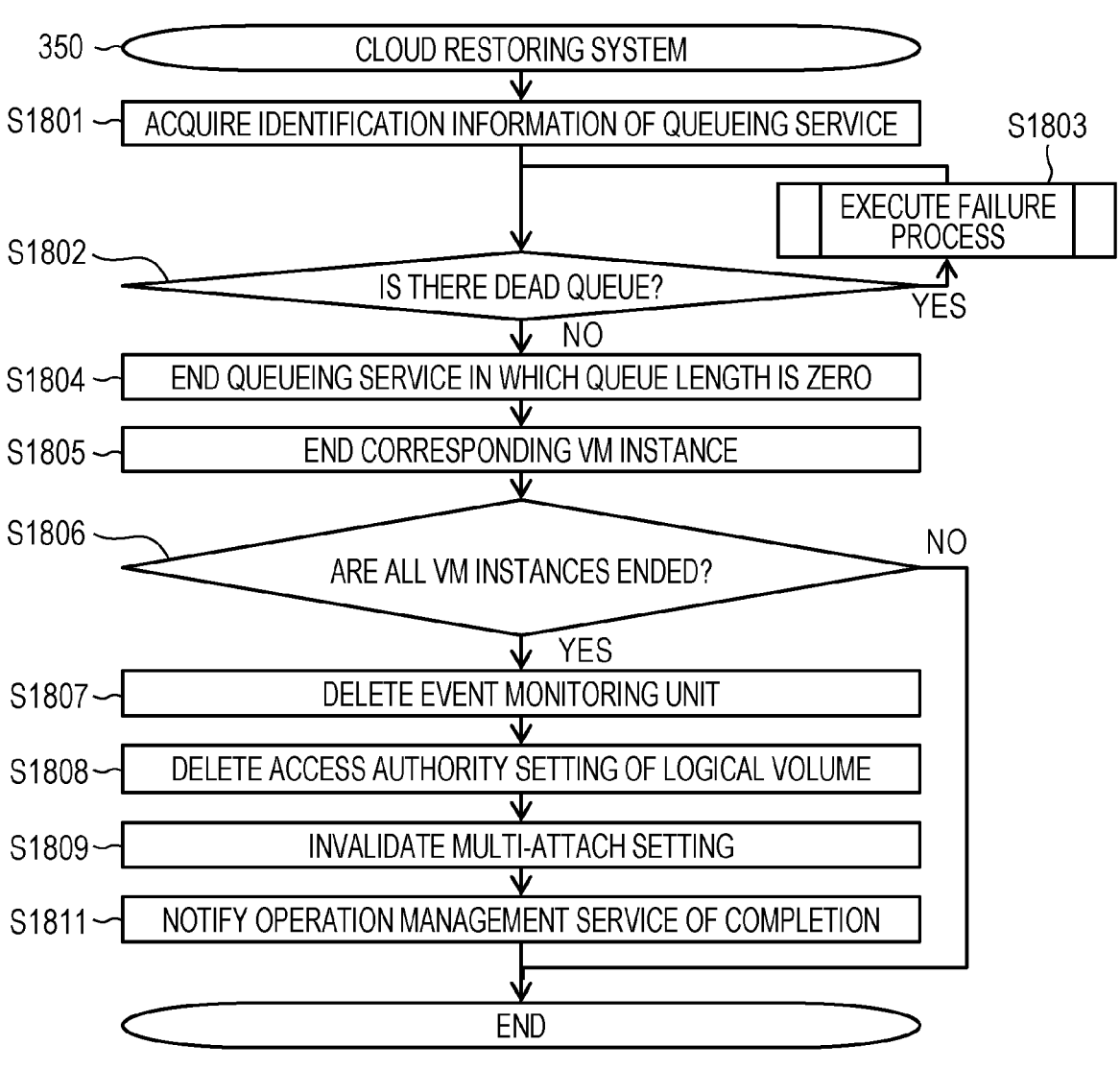
FIG. 18 illustrates processing when a queue length is zero in restoration.

FIG. 18 illustrates a flowchart of processing of the cloud restoring system 350 when the event monitoring unit 1195 notifies that the queue length (the number of pairs of object keys) loaded in the queue service 1194 is zero.

In Step 1801, upon receiving a notification, from the event monitoring unit 1195, that the queue length is zero, the cloud restoring system 350 acquires identification information of a target queue service 1194. In Step 1802, the cloud restoring system 350 checks whether there is a dead queue in the queue service 1194 corresponding to the identification information. In a case where there is a dead queue (Yes in Step 1802), which means that a processing failure has occurred, and thus the cloud restoring system 350 executes an appropriate failure process in Step 1803. After Step 1803, again in Step 1802, the cloud restoring system 350 checks a dead queue. The failure process executed in Step 1803 is, for example, re-execution of the processes in Step 1402 and Steps 1416 to 1420 only for the LBA management region 571 corresponding to the pair of object keys stored in the dead queue. In a case where there is no dead queue (No in Step 1802), in Step 1804, the computer resource release unit 136 constructed by the cloud restoring system 350 ends the queue service 1194 in which the queue length is zero (releases the resource). In Step 1805, the computer resource release unit 136 ends the VM instance 1191 associated with the queue service 1194 (releases the resource). In the middle of releasing the resource, the connection path 1192 configured in Step 1414 in FIG. 14 is also released. In a case where all the VM instances 1191 (and the queue service 1194) are ended (Yes in Step 1806), this means that the restoration process is ended (completed). Therefore, in Step 1807, the computer resource release unit 136 deletes the event monitoring unit 1195 that remains in the computer resource 390 (releases the resource). In Step 1808, the computer resource release unit 136 deletes the setting contents of the access authority related to the logical volume 1070 which is the transfer destination in the restoration process, from the access control layer 1040. Further, in Step 1809, the setting change unit 135 constructed by the cloud restoring system 350 invalidates the multi-attach setting of the logical volume 1070 as necessary. Thereafter, in Step 1811, the cloud restoring system 350 notifies the storage operation management service 330 of completion of the restoration process. When receiving the notification of completion of the restoration process, the storage operation management service 330 deletes the access authority for the backup data store 340, which has been given to the cloud restoring system 350, and notifies the user or the like that the restoration process has been completed through the terminal 380 or the like (not illustrated).

According to the first embodiment, the logical volume 1070 can be divided into the plurality of LBA management regions 571 and processed in parallel by using the VM instance 1191 which is the temporary computer resource. Thus, the restoration time can be shortened.

The restoration process corresponding to the difference backup process requires superimposition of a plurality of generations, but since the restoration process of the same LBA management region 571 and different generations is executed by the same VM instance, data can be written in the correct generation order.

In addition, since the computer resources are temporarily increased to cope with the restoration process, it is possible to make the computer resources during a normal operation to have appropriate performance, and the computer resources and the power consumption thereof can be reduced.

4. Second Embodiment (Backup Process) of Present Disclosure

A second embodiment has a configuration for backing up a logical volume (an example of the volume) on a cloud to a backup data store in a short time. An example in which a temporary computer resource is used as the computer resource for executing the backup process will be described below.

Figure 19:
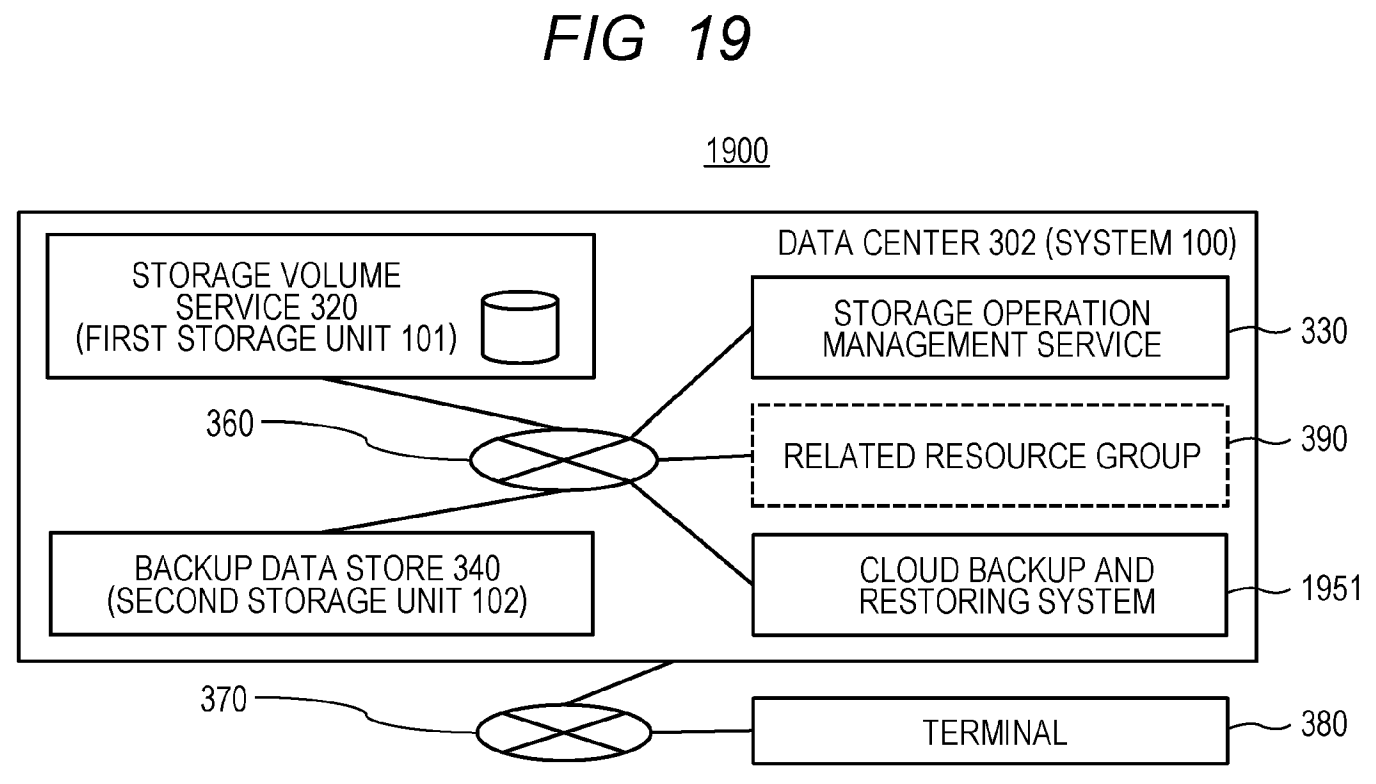

4-1. System Configuration of Second Embodiment (Backup Process) of Present Disclosure 4-1-1. System Configuration of Computer System Including System of Present Disclosure FIG. 19 illustrates a system configuration of a computer system 1900 including a system 100 according to the second embodiment of the present disclosure. The computer system 1900 includes a data center 302 (system 100) and a terminal 380 enabled to communicate with each other via a network 370, but does not include (may include) an on-premises data center according to the first embodiment. Similar to the first embodiment, the data center 302 in the second embodiment is, for example, a virtual data center provided by a public cloud service provider. The difference from the first embodiment is that the data center 302 includes a cloud backup and restoring system 1951 instead of the cloud restoring system 350.

4-1-2. Computer Resource Constructed for Backup Process

The cloud backup and restoring system 1951 according to the second embodiment of the present disclosure constructs (activates) a computer resource 390 as a related resource group, and the computer resource 390 executes a backup process.

Figure 20:
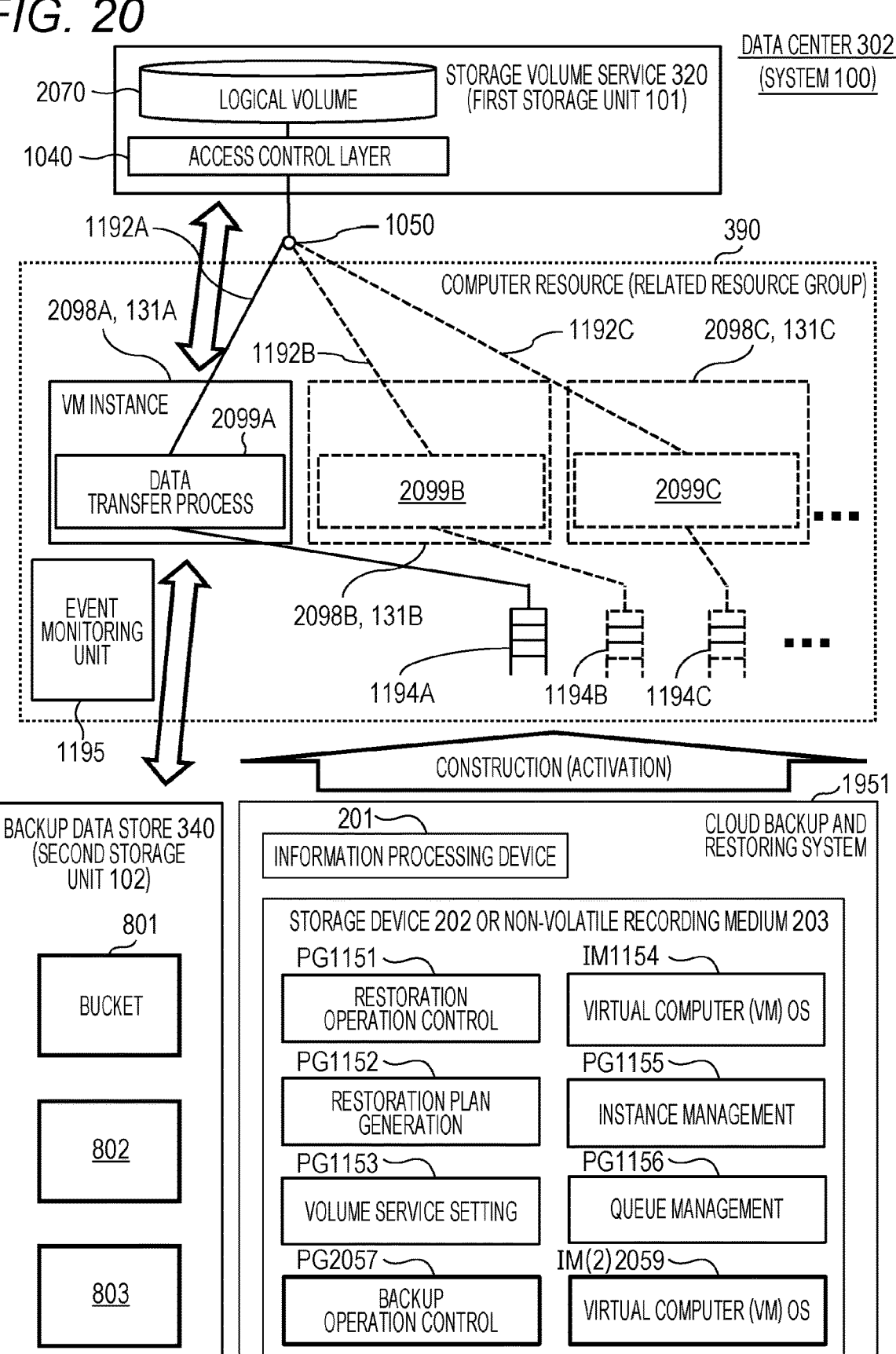
FIG. 20 illustrates computer resources constructed in the backup process.

FIG. 20 is a diagram illustrating a relationship among the cloud backup and restoring system 1951, the computer resources 390 constructed (activated, generated) during processing of the cloud backup and restoring system 1951, a storage volume service 320 (first storage unit 101), and a backup data store 340 (second storage unit 102), in the second embodiment. As illustrated in FIG. 19, the cloud backup and restoring system 1951, the computer resources 390, the storage volume service 320, and the backup data store 340 are configured to be communicably connected to each other via the internal network 360 (not illustrated). Description of the same or similar elements as those in the first embodiment will be omitted, and only different elements will be described.

In the second embodiment, a logical volume 2070 provided by the storage volume service 320 is a logical volume as a transfer source in the backup process. As in the first embodiment, the logical volume 2070 is provided to be accessible through an access end-point 1050. The cloud backup and restoring system 1951 is obtained by extending the function of the cloud restoring system 350 according to the first embodiment. The cloud backup and restoring system 1951 additionally has a function of performing backup from the storage volume service 320 to the backup data store 340. The cloud backup and restoring system 1951 includes the information processing device 201 as illustrated in FIG. 2 and also includes the storage device 202 or the non-volatile recording medium 203. A storage device 202 or a non-volatile recording medium 203 stores a restoration operation control program 1151, a restoration plan generation program 1152, a volume service setting program 1153, a virtual computer (VM) OS image 1154, an instance management program 1155, and a queue management program 1156. The storage device 202 or the non-volatile recording medium 203 additionally stores a backup operation control program 2057 and a VM OS image(2) 2059. The information processing device 201 executes the programs or images, thereby realizing the process executed by the cloud backup and restoring system 1951. The backup operation control program 2057 is a main program for an instruction of the entirety of the processing until completion of the backup process, when an instruction of the backup process is received from the terminal 380. The VM OS image(2) 2059 is a file storing an OS for operating a VM instance 2098 and a program operating thereon. The VM OS image(2) 2059 and the VM OS image 1154 may be combined into one by commonization of an operation program. The computer resource 390 is similar to that of the first embodiment, and includes a queue service 1194, a virtual computer (VM) instance 2098, and an event monitoring unit 1195, which are dynamically constructed (created) by the cloud backup and restoring system 1951 executing each program or image. The VM instance 2098 is a server computer resource constructed by using the VM OS image(2) 2059. After the activation of the OS, each VM instance 2098 executes a program included in the VM OS image(2) 2059 to construct (activate) a data transfer process 2099 (2099A, 2099B, and 2099C). The data transfer process 2099 monitors the presence or absence of a processing request in a queue service 1194 in charge based on the identification information transferred as an argument.

4-2. Process of Second Embodiment (Backup Process) of Present Disclosure

Based on the system configuration of the second embodiment described above (and the system configuration of the first embodiment), a series of processes executed for the backup process to a backup data store 340 associated with the second storage unit 102 from the logical volume 2070 in the storage volume service 320 associated with the first storage unit 101 will be described below.

4-2-1. Until Backup and Restoring System is Instructed to Execute Backup Process First, a procedure until a storage operation management service 330 that has received the setting contents of the backup process input by the user or the like using a backup setting screen 600 instructs the cloud backup and restoring system 1951 to execute the backup process will be described below.

Figure 21:
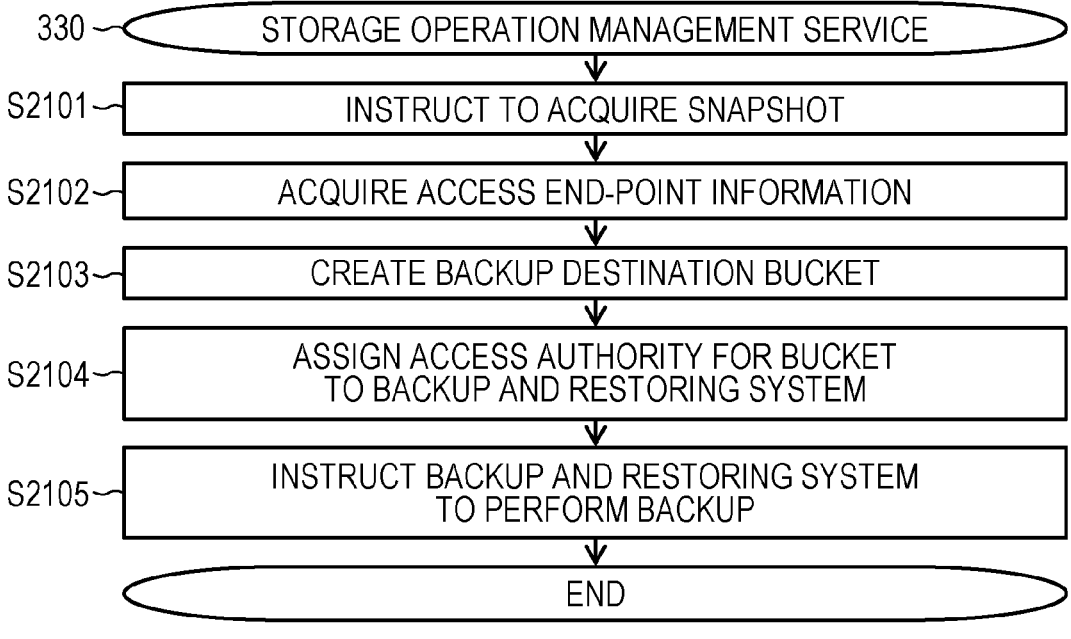
FIG. 21 illustrates processing until a backup instruction is given to a backup and restoring system.

FIG. 21 illustrates a flowchart of processing until the storage operation management service 330 instructs the cloud backup and restoring system 1951 to execute the backup process in the second embodiment. The processing of FIG. 21 is performed based on a schedule set in the storage operation management service 330 by the user or the like using the backup setting screen 600 of FIG. 6.

In Step 2101, the storage operation management service 330 instructs the storage volume service 320 to acquire a snapshot of the logical volume 2070 in order to acquire a still image of the logical volume 2070 as a transfer source in the backup process. Subsequently, in Step 2102, the storage operation management service 330 instructs the storage volume service 320 to create the access end-point 1050 for the snapshot so that backup can be performed by using the snapshot, and acquires information of the access end-point 1050. (In Step 2102, the storage operation management service 330 may create the access end-point 1050 for the snapshot by itself.) Then, in Step 2103, the storage operation management service 330 creates a bucket as a backup storage destination in the backup data store 340. In Step 2104, the storage operation management service 330 gives an access authority for the bucket to the cloud backup and restoring system 1951. In Step 2105, the storage operation management service 330 instructs the cloud backup and restoring system 1951 to execute the backup process by using the information of the access end-point 1050 of (the snapshot of) the logical volume 2070 and backup storage destination information of the backup data store 340.

4-2-2. Processing of Backup and Restoring System Instructed to Execute Backup Process The cloud backup and restoring system 1951 instructed to execute the backup process from the storage operation management service 330 determines the number of temporary computer resources (for example, VM instances 2098) to be constructed (activated) for the backup process, and constructs (activates) the determined number of temporary computer resources (VM instances 2098). The cloud backup and restoring system 1951 mounts (a snapshot of) one common logical volume 2070 as the transfer source in the backup process on each of the activated temporary computer resources (VM instances 2098). The cloud backup and restoring system 1951 allocates a (write) data group (block data group) for each management region with respect to data that is a target of the backup process, to each of the activated temporary computer resources (VM instances 2098). The above processing will be described in order below.

Figure 22:
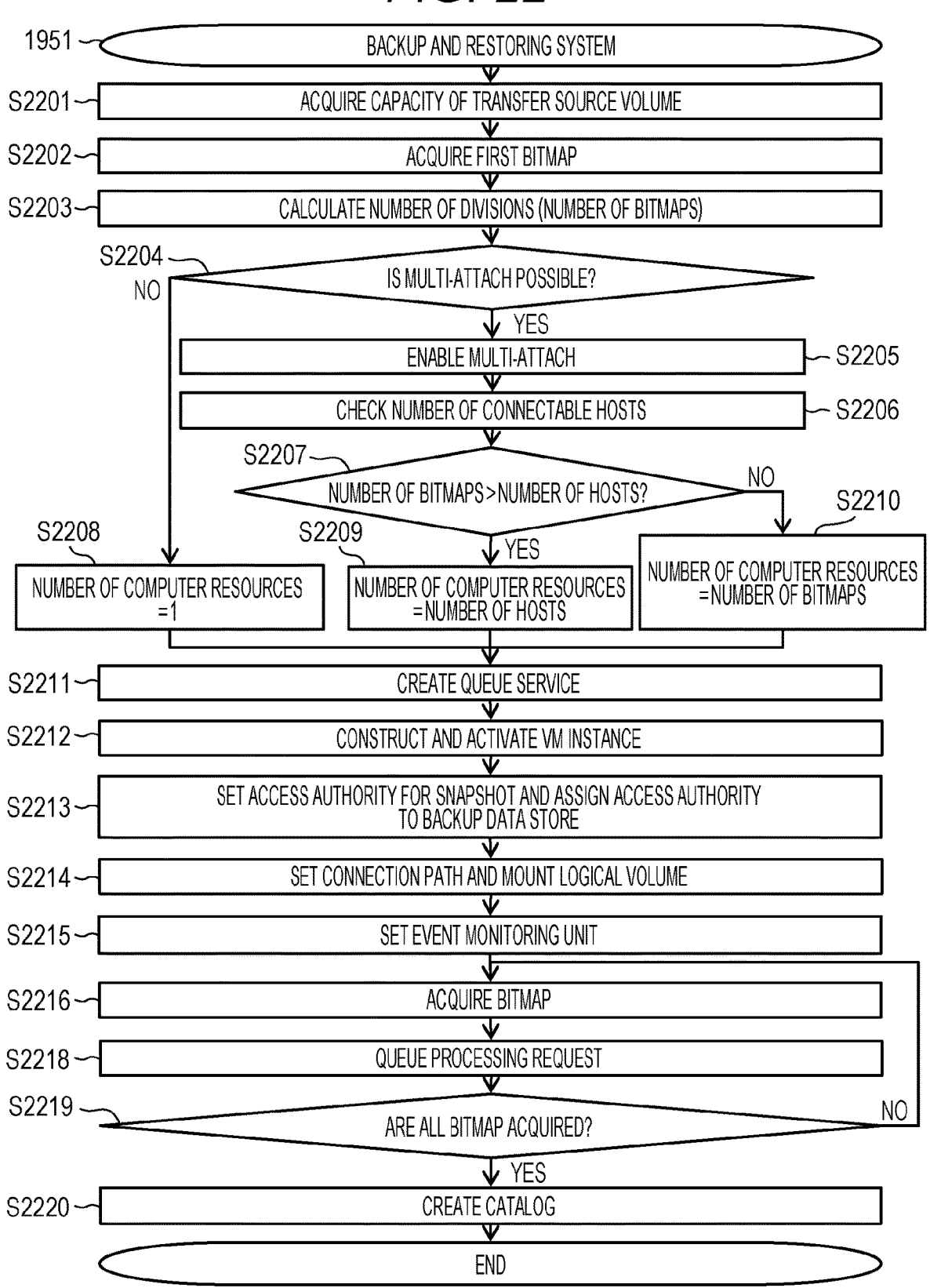
FIG. 22 illustrates processing performed by the backup and restoring system at the time of backup.

FIG. 22 illustrates a flowchart of processing when the cloud backup and restoring system 1951 receives an instruction to perform backup from the storage operation management service 330 in the second embodiment.

4-2-2-1. Determination of Number of Computer Resources to be Constructed (Activated) for Backup Process In Step 2201 of FIG. 22, the cloud backup and restoring system 1951 acquires information of the capacity of (the snapshot of) the logical volume 2070 as the transfer source in the backup process, by using the information of the access end-point 1050 received at the time of the instruction. In Step 2202, the cloud backup and restoring system 1951 acquires a first difference management bitmap 500. In Step 2203, the cloud backup and restoring system 1951 acquires configuration information of the difference management bitmap 500, and calculates how many management regions 571 (112) (snapshots) of the logical volume 2070 are divided and managed, that is, how many difference management bitmaps 500 are included based on the configuration information. Then, in Step 2204, a setting change unit 135 constructed by the cloud backup and restoring system 1951 checks whether or not (the snapshot of) the logical volume 2070 is multi-attachable. In a case where the logical volume 2070 is multi-attachable (Yes in Step 2204), in Step 2205, the setting change unit 135 enables multi-attach of (the snapshot of) the logical volume 2070. A method of setting the enabling may include, for example, a method of enabling a multi-attach permission of (the snapshot of) the logical volume 2070 or a method of changing (the snapshot of) the logical volume 2070 to a multi-attachable disk type. Thereafter, in Step 2206, a computer resource number determination unit 132 constructed by the cloud backup and restoring system 1951 checks the number of connectable hosts of (the snapshot of) the logical volume 2070 as the target of the backup process. In Step 2207, the computer resource number determination unit 132 compares the number of difference management bitmaps 500 corresponding to the logical volume 2070 with the number of connectable hosts of (the snapshot of) the logical volume 2070. In a case where the number of difference management bitmaps 500 is more than the number of connectable hosts (Yes in Step 2207), in Step 2209, the computer resource number determination unit 132 sets the number of computer resources to be activated in the subsequent backup process to be the same as the number of connectable hosts. On the other hand, in a case where the number of difference management bitmaps 500 is equal to or less than the number of connectable hosts (No in Step 2207), the computer resource number determination unit 132 sets the number of computer resources for executing the backup process to be the same as the number of difference management bitmaps 500 in Step 2210. In a case where (the snapshot of) the logical volume 2070 is not multi-attachable (No in Step 2204), the computer resource number determination unit 132 sets the number of computer resources for executing the backup process to 1 in Step 2208. Although not illustrated, in a case where the number of computer resources for executing the backup process defined in the above description of Step 2209 or Step 2210 is in conflict with a specification of the cloud system (for example, a design specification of the storage volume service 320, a design specification of the entire data center 302, or a contract restriction of a user or the like who uses a service provided by the data center 302), the computer resource number determination unit 132 may determine the number of computer resources again within a range without conflicting with the specification. Some or all of Steps 2206, 2207, 2208, 2209, and 2210 may constitute a computer resource number determination step.

As described above, in the present disclosure, the number of computer resources to be constructed (activated) can be appropriately determined in consideration of both the maximum number of hosts related to the volume and the number of management regions included in the volume. Here, in the present disclosure, the number of management regions included in the volume is determined by the number of pieces of first management information (for example, the difference management bitmap) associated with the management regions. Thus, the number of management regions included in the volume can be appropriately determined.

4-2-2-2. Construction (Activation) of Computer Resource and Mounting (Multi-Attach) Setting After the computer resource number determination unit 132 determines the number of computer resources that execute the backup process, in Steps 2211 to 2215, the cloud backup and restoring system 1951 constructs (activates) a queue service 1194 and the VM instance 2098 based on the determined number of computer resources, sets an access authority, performs the mount setting of (the snapshot of) the logical volume 2070, and sets a connection path 1192. The cloud backup and restoring system 1951 also sets an event monitoring unit 1195. Since the contents of the processes in Steps 2211 to 2215 are basically the same as those in Steps 1411 to 1415 in FIG. 14 in the first embodiment, the detailed description thereof will be omitted.

4-2-2-3. Allocation of Process to Each Computer Resource

After completion of construction (activation) or the like of the VM instance 2090 that is the computer resource, in Step 2216, a region allocation unit 134 constructed by the cloud backup and restoring system 1951 sequentially acquires the difference management bitmap 500. In Step 2218, the region allocation unit 134 creates a processing request by using four pieces of information including the information of the difference management bitmap 500, information of the start LBA of a management region 571 (112) corresponding to the difference management bitmap 500, information of a storage destination bucket of the backup data store 340, and information of the seed of an object name, and sequentially queues the processing request to the queue service 1194. Here, the seed of the object name is the base of an object name given when the difference management bitmap (bit-map-) or the block data group (block-) is stored. For example, "7f-001.000" configured by a volume number (for example, 7F), a generation (for example, 001), and a difference management bitmap number (for example, 000) is used. The queued processing request may include the difference management bitmap 500 itself or may include information for identifying the location of the difference management bitmap 500. In Step 2219, the region allocation unit 134 determines whether or not all the difference management bitmaps 500 included in the logical volume 2070 as the transfer source in the backup process have been acquired based on the number of difference management bitmaps 500 obtained in Step 2203. In a case where there is still the remaining difference management bitmap 500 (No in Step 2219), the region allocation unit 134 repeats the processes of Steps 2216 and 2218. On the other hand, in a case where the queuing processing has been completed for all the difference management bitmaps 500 corresponding to the logical volume 2070 (Yes in Step 2219), the cloud backup and restoring system 1951 creates a backup catalog related to the backup process. Some or all of Steps 2216, 2218, and 2219 may construct a region allocation step.

4-2-2-4. Process Executed by VM Instance in Backup Process

The VM instance 2098 executes a part of the backup process corresponding to the management region corresponding to the processing request received from the corresponding queue service 1194.

Figure 23:
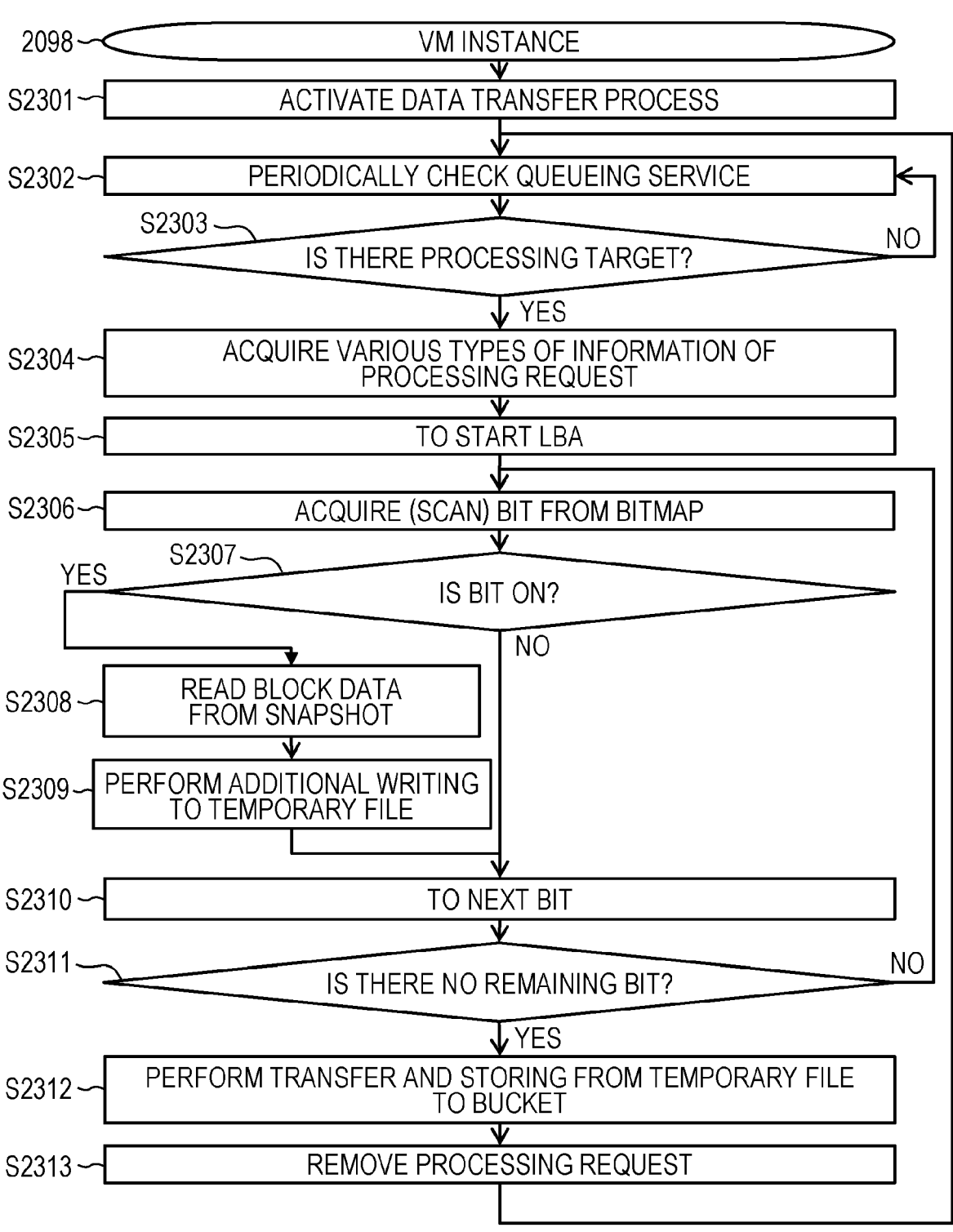
FIG. 23 illustrates processing performed by a virtual computer instance at the time of backup.

FIG. 23 illustrates a flowchart of processing of the VM instance 2098 during the backup process.

In Step 2301, the VM instance 2098 activates the data transfer process 2099 by executing a program included in a VM OS image(2) 2059. With an operation flow of FIG. 22, the VM instance 2098 is set to be accessible to the backup data store 340 and (a snapshot of) the logical volume 2070 as the transfer source in the backup process. In Step 2302, the data transfer process 2099 that operates on the VM instance 2098 periodically checks whether or not there is a processing request in the queue service 1194 corresponding to the identification information of the queue service transferred as an argument at the time of activation. In a case where there is the processing request in the queue service 1194 (Yes in Step 2303), in Step 2304, the data transfer process 2099 refers to the processing request in the queue service 1194, and acquires various types of information such as information of the difference management bitmap 500, information of the start LBA of the management region 571 (112) corresponding to the difference management bitmap 500, information of the storage destination bucket of the backup data store 340, and information of the seed of the object name. In Step 2305, the data transfer process 2099 sets the acquired start LBA position as a reference destination LBA related to the backup process (moves to the start LBA). In Step 2306, the data transfer process 2099 sequentially acquires (scans) bits of the difference management bitmap 500. In a case where the bit is ON (Yes in Step 2307), this means that there is data for executing the backup process in the LBA corresponding to the bit, and thus, in Step 2308, the data transfer process 2099 reads block data from the LBA of (the snapshot of) the logical volume 2070. Then, in Step 2309, the data transfer process 2099 adds the block data read in Step 2308 to a temporary file that stores a block data group for executing the backup process. Then, in Step 2310, the data transfer process 2099 advances a reference destination LBA of (the snapshot of) the logical volume 2070 and a reference destination bit of the difference management bitmap 500 by one. On the other hand, in a case where the bit is OFF (No in Step 2307), this means that there is no data for executing the backup process in the LBA corresponding to the bit. Thus, in Step 2310, the data transfer process 2099 advances the reference destination LBA of (the snapshot of) the logical volume 2070 and the reference destination bit of the difference management bitmap 500 by one without doing anything. In Step 2311, the data transfer process 2099 determines whether or not all bits of the difference management bitmap 500 have been referred to. In a case where there is a bit that has not yet been referred to (No in Step 2311), the data transfer process 2099 repeats the processes of Steps 2306 to 2310. On the other hand, in a case where all the bits have been referred (Yes in Step 2311), since the process of reading the block data group from (the snapshot of) the logical volume 2070 to the temporary file has been completed among the processes related to the processing request handled in Step 2304, the data transfer process 2099 stores the difference management bitmap 500 and the block data group stored in the temporary file, as the object file in the storage destination bucket of the backup data store 340 in Step 2312. At that time, the data transfer process 2099 determines an object name by using the seed of the object name. For example, in a case where the seed of the object name is "7f-001.000", the data transfer process 2099 names the object file of the difference management bitmap 500 as "bitmap-7f-001.000", and names the object file of the block data group as "block-7f-001.000". After storage in the backup data store 340, in Step 2313, the data transfer process 2099 removes (dequeues) the processing request handled in Step 2304 from the queue service 1194, returns control to Step 2302, and periodically checks again whether or not there is an unprocessed processing request in the queue service 1194.

In the operation flow of FIG. 23, the block data group is additionally written to the temporary file and is collectively stored in the backup data store 340 at the last. Here, for each certain size, the block data group may be transferred to the backup data store 340, or the block data may be transferred to the backup data store 340 each time. At this time, the block data (group) may be stored in the backup data store 340 in a manner divided into object files of a smaller size, or the block data (group) to be stored later may be additionally written to the object file of the previously stored block data (group).

4-2-2-5. Resource Release of VM Instance in Backup Process

In a case where there are a plurality of VM instances 2098 constructed (activated) for executing the backup process, the cloud backup and restoring system 1951 and the computer resources 390 can be sequentially released from the VM instances 2098 for which the allocated process is completed without waiting for completion of the entirety of the backup process.

FIG. 24 is a flowchart illustrating an operation of the cloud backup and restoring system 1951 when the event monitoring unit 1195 notifies that the number of processing requests (queue length) loaded in the queue service 1194 is zero, in the second embodiment.

When the cloud backup and restoring system 1951 receives a notification that the queue length is zero from the event monitoring unit 1195 in Step 2401, the cloud backup and restoring system 1951 acquires identification information of the queue service 1194 in which the queue length is zero. In Step 2402, the cloud backup and restoring system 1951 checks whether there is a dead queue in the queue service 1194 corresponding to the identification information. In a case where there is a dead queue (Yes in Step 2402), this means that a processing failure has occurred, and thus the cloud backup and restoring system 1951 executes an appropriate failure process in Step 2403. Thereafter, in Step 2402, the cloud backup and restoring system 1951 checks the dead queue again. The failure process may be, for example, a process in which the region allocation unit 134 re-executes the processes of Step 2216 and Step 2218 only for the LBA management region stored in the dead queue. In a case where there is no dead queue (No in Step 2402), in Step 2404, the computer resource release unit 136 constructed by the cloud backup and restoring system 1951 ends the queue service 1194 in which the queue length is zero. At the same time, in Step 2405, the computer resource release unit 136 ends the VM instance 2098 associated with the queue service 1194 in which the queue length of zero (releases the resource). In the middle of the release, the connection path 1192 configured in Step 2214 in FIG. 22 is also released. In a case where all the VM instances 2098 (and the queue service 1194) are ended (Yes in Step 2406), this means that the backup process is ended. Therefore, in Step 2407, the computer resource release unit 136 deletes the event monitoring unit 1195 that remains in the computer resource 390. In Step 2408, the computer resource release unit 136 deletes the setting of the access authority of (the snapshot of) the logical volume 2070 as the transfer source of the backup process from the access control layer. In Step 2409, the setting change unit 135 constructed by the cloud backup and restoring system 1951 invalidates the multi-attach setting of (the snapshot of) the logical volume 2070 as the transfer source of the backup process as necessary. Thereafter, in Step 2410, the cloud backup and restoring system 1951 stores the backup catalog previously created in Step 2220 in the backup data store 340. Then, in Step 2411, the cloud backup and restoring system 1951 notifies the storage operation management service 330 of the completion of the backup process by using the backup catalog.

According to the second embodiment, the backup of the logical volume 1070 can be divided into a plurality of LBA management regions 571 and processed in parallel by using the VM instance 2098 which is the temporary computer resource. Thus, the backup time can be shortened.

5. Others (Modification Examples)

The present disclosure is not limited to the above embodiments but includes various modification examples. A part of the configuration and processing of the embodiment may be replaced with the configuration and processing of another possible embodiment. Other possible configurations and processes of the embodiments may be added to the configurations and processes of the embodiments.

In the above embodiments, the virtual computer (VM) instance, which is a temporary computer resource, is taken up as the computer resource that executes the data transfer process (for example, backup process or restoration process), but another type of temporary computer resource (for example, a container) may be used. In addition, computer resources that are not temporary computer resources may be computer resources that execute the data transfer process. For example, hardware-like computer resources may be directly allocated to the data transfer process. As described above, in the present disclosure, the configuration of the computer resources for realizing the data transfer process can be appropriately selected from a wide range of options.

The technical matters described in each of the embodiments of the present disclosure and the modification examples of the embodiments described above can be appropriately combined as long as no technical contradiction occurs.

What is claimed is:

1. A system comprising:
a first storage unit including at least one volume for storing data, and one of the at least one volume includes one or more storage regions;
a second storage unit; and
a processor communicatively coupled to the first storage unit and the second storage unit, and configured to:
activate one or more computer resources, creating one or more activated computer resources, for executing a data transfer process when the data transfer process is executed between one of the at least one volume and the second storage unit, and
mount one common volume as a transfer source or a transfer destination in the data transfer process on at least one activated computer resource of the one or more activated computer resources, by causing the at least one activated computer resource to recognize the one common volume and enabling the at least one activated computer resource to access data of the one common volume,
wherein the one common volume is a volume of the at least one volume,
allocate the data transfer process to the at least one activated computer resource, and
execute, via the at least one activated computer resource, the data transfer process allocated to the at least one activated computer resource between each of the one or more storage regions in the one common volume mounted on the at least one activated computer resource and the second storage unit.

2. The system according to claim 1, wherein
the data transfer process is a backup process from one of the at least one volume to the second storage unit or a restoration process from the second storage unit to the at least one volume,
the one or more storage regions are management regions,
the first storage unit includes first management information indicating whether the data at any position in the management regions is to be set as a target of the backup process for each of the management regions for the one of the at least one volume,
the second storage unit stores backup data for each backup process of one generation for the at least one volume on which the backup process has been executed, and
the backup data for the one generation includes, for each of the management regions, a data group including data backed up from the management regions in the at least one volume and second management information indicating a position in the at least one volume corresponding to the data included in the data group.

3. The system according to claim 2, wherein
the one or more computer resources are temporary computer resources,
the one common volume is associated with a number of connectable hosts, wherein the number of connectable hosts is a number of the temporary computer resources that are capable of having the one common volume mounted thereon as the transfer destination or the transfer source, and
the processor is further configured to:
determine, for the one common volume as the transfer source in the backup process or the transfer destination in the restoration process, a smaller number of a number of the management regions included in the one volume and the number of connectable hosts associated with the one volume, as a set number of the number of the temporary computer resources that execute the backup process or the restoration process, and
assign the set number as a number of the temporary computer resources to be activated as the one or more activated computer resources.

4. The system according to claim 3, wherein
the processor determines the number of the management regions included in the one volume based on a number of pieces of the first management information corresponding to the one common volume or a number of pieces of the second management information corresponding to the backup process of one generation in the one common volume.

5. The system according to claim 2, wherein
the backup process is a difference backup process of transferring, to the second storage unit, only data written to the volume as a transfer source in the backup process after a time point of a previous backup process,
the restoration process is a process of executing restoration processes of all generations before a generation indicating a time point of restoration by the restoration process in order from an older generation,
the processor allocates the restoration processes of different generations to a same computer resource when allocating the restoration processes of the different generations related to a same management region in the one volume as a transfer destination in the restoration process during the restoration process, and
the at least one activated computer resource executes the restoration process in order of a normal processing result in a case where the restoration processes of a plurality of generations related to the same management region are allocated.

6. The system according to claim 5, wherein
for each combination of generations that can be set as targets of the restoration process and the management regions that can be set as the targets of the restoration process in the restoration process, in a case where the second management information corresponding to any of the combination of generations indicates that at least one piece of data in a management region is backed up in the second storage unit, the processor allocates the restoration process related to the combination of generations to any of the one or more computer resources.

7. The system according to claim 1, wherein the processor is further configured to
determine, as a determined number, a number of computer resources that execute the data transfer process when the data transfer process is executed between the one volume and the second storage unit, and assign the determined number as a number of the one or more computer resources to be activated as the one or more activated computer resources.

8. The system according to claim 1, wherein the data transfer process includes data transfer processes of a plurality of generations for each of the one or more storage regions as the transfer source or the transfer destination in the data transfer process, the processor allocates the data transfer processes of a plurality of generations related to a same storage region or the one or more storage regions to a same computer resource in the data transfer process, and the same computer resource executes the data transfer processes of the plurality of generations related to the same storage region in order of a normal processing result.

9. The system according to claim 1, wherein the system is a cloud system, and the at least one volume or the second storage unit is usable by another system or device via a network.

10. The system according to claim 1, wherein the second storage unit is a backup data store in an object storage format.

11. The system according to claim 1, wherein the processor constructs a connection path from the one or more activated computer resources to the one common volume mounted on the at least one activated computer resource.

12. The system according to claim 1, wherein the processor is further configured to:

change a setting of the one common volume to a multi-attachable disk type when one volume, of the at least one volume, that is common to a plurality of the computer resources is mounted, and brings the setting of the one common volume back to a non-multi-attachable disk type when the data transfer process is completed.

13. The system according to claim 1, wherein the at least one activated computer resource is an at least one activated temporary computer resource, and the processor releases the at least one activated temporary computer resource that has completed the data transfer process even before an entirety of the data transfer process is completed.

14. A method performed by a system including a processor, a first storage unit having at least one volume for storing data, and one of the at least one volume includes one or more storage regions, and a second storage unit, comprising:

activating one or more computer resources, creating one or more activated computer resources, for executing a data transfer process when the data transfer process is executed between one of the at least one volume and the second storage unit;

mounting one common volume serving as a transfer source or a transfer destination in the data transfer process on at least one activated computer resource of the one or more activated computer resources; and allocating the data transfer process to the at least one activated computer resource, wherein mounting the one common volume on the at least one activated computer resource includes causing the at least one activated computer resource to recognize the one common volume and enabling the at least one activated computer resource to access data of the one common volume, wherein the one common volume is a volume of the at least one volume, and wherein the at least one activated computer resource executes the data transfer process allocated to the at least one activated computer resource between each of the one or more storage regions in the one common volume mounted on the at least activated computer resource and the second storage unit.

15. A non-transitory computer-readable medium storing a program, when executed by a processor in a system including the processor, a first storage unit having at least one volume for storing data, and one of the at least one volume includes one or more storage regions, and a second storage unit, causes the processor to:

activate one or more computer resources, creating one or more activated computer resources, for executing a data transfer process when the data transfer process is executed between one of the at least one volume and the second storage unit;

mount one common volume serving as a transfer source or a transfer destination in the data transfer process on at least one activated computer resource of the one or more activated computer resources; and allocate the data transfer process to the at least one activated computer resource, wherein mounting the one common volume on the at least one activated computer resource includes causing the at least one activated computer resource to recognize the one common volume and enabling the at least one activated computer resource to access data of the one common volume, wherein the one common volume is a volume of the at least one volume, and wherein the at least one activated computer resource executes the data transfer process allocated to the at least one activated computer resource between each of the one or more storage regions in the one common volume mounted on the at least activated computer resource and the second storage unit.

* * * * *